(12) United States Patent
Watanabe

(10) Patent No.: US 7,225,268 B2
(45) Date of Patent: May 29, 2007

(54) RADIO TERMINAL THAT DECIDES A BEST ROUTE BASED ON WEIGHT VALUES OF COMMUNICATION PATHS

(75) Inventor: Mitsuhiro Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 735 days.

(21) Appl. No.: 10/293,365

(22) Filed: Nov. 14, 2002

(65) Prior Publication Data
US 2003/0091001 A1 May 15, 2003

(30) Foreign Application Priority Data
Nov. 15, 2001 (JP) ............................. 2001-350616

(51) Int. Cl.
G06F 15/16 (2006.01)
H04L 12/28 (2006.01)

(52) U.S. Cl. ...................... 709/238; 709/239; 709/240; 370/254; 370/400

(58) Field of Classification Search ................ 709/224, 709/225, 239, 240; 340/539.19; 370/353, 370/390, 395, 254, 400
See application file for complete search history.

(56) References Cited

U.S. PATENT DOCUMENTS

| | | | |
|---|---|---|---|
| 6,201,810 B1 | 3/2001 | Masuda et al. | |
| 6,389,010 B1* | 5/2002 | Kubler et al. | ................ 370/353 |
| 6,826,607 B1* | 11/2004 | Gelvin et al. | ................ 709/224 |
| 7,002,949 B2* | 2/2006 | Garcia-Luna-Aceves et al. | 370/351 |
| 2003/0202479 A1* | 10/2003 | Huang et al. | ................ 370/252 |

FOREIGN PATENT DOCUMENTS

| | | |
|---|---|---|
| JP | 10-065733 | 3/1998 |
| JP | 10-276208 | 10/1998 |
| JP | 2000-4469 | 1/2000 |
| JP | 2000-49852 | 2/2000 |
| JP | 2000-341199 | 12/2000 |

OTHER PUBLICATIONS

M. Nishizawa et al., "A Routing Method Considering Uni-directional Links in Ad-hoc Networks," Transactions of the Information Processing Society of Japan, vol. 41:3, Mar. 2000; pp. 783-791.

* cited by examiner

Primary Examiner—Jeffrey C. Pwu
(74) Attorney, Agent, or Firm—Foley & Lardner LLP

(57) ABSTRACT

A wireless terminal capable of quickly searching for the best route required for communication in a local network such as an ad hoc network is provided. Each of wireless terminals in the local network sets a bit error rates and a data transfer rate with neighboring wireless terminals and, based on the calculated values, calculates the route weight value of a link to each of the neighboring terminals. To set a route for communication between a wireless terminal and another wireless terminal, the wireless terminal issues a route search command based on the route weight value and sends the route weight value to neighboring terminals. The neighboring terminals also send the route search command sequentially to the next terminal while adding up the route weight value. A wireless terminal at the other end decides the best route from the added up route weight value and sends a response back to the starting point.

12 Claims, 20 Drawing Sheets

RADIO TERMINAL THAT DECIDES A BEST ROUTE BASED ON WEIGHT VALUES OF COMMUNICATION PATHS

FIELD OF THE INVENTION

The present invention relates to a wireless terminal, and more particularly to a wireless terminal that can set up a route to a terminal at the other end with which communication is to be established in a local network.

BACKGROUND OF THE INVENTION

Radio terminals such as portable terminals have become widely used with more and more attention on a local communication among those wireless terminals. A typical such local network is an ad hoc network. An ad hoc network is a local network temporarily created as required. A wireless terminal belonging to the network does not know what terminals are in the network. Nor is there a server that centrally manages the network. The wireless terminals do not have to create a special setting for communication but autonomously recognize surrounding wireless terminals to build a network for information exchange or sharing. On this network, there is a possibility that a wireless terminal suddenly leaves the network. A need therefore exists for a mechanism that can prepare for such a change.

In building such a local network, we must take into consideration how one wireless terminal transfers data to another wireless terminal via what wireless terminal. In general, when data is transferred between computers, IP (Internet Protocol) data is transferred from an IP address to a destination IP address in the network layer of the OSI (Open System Interconnection) using a routing protocol. In this case, as a routing protocols used for path selection, there are provided a first method that employs distance vector routing in which the distance is used as the selection condition and a second method that employs link state vector routing in which the link state is used as the selection condition.

Distance vector routing, given as a first method above, uses a hop count, which is the count number of gateway hops, as a factor determining the IP-datagram delivery route in order to calculate the distance vector. The route is determined by selecting a path whose distance vector is short. The hop count refers to the number of gateways encountered by an IP-datagram from a source terminal connected to a LAN (Local Area Network) to a destination terminal connected to another LAN.

Link state vector routing, given as a second method above, maps information indicating whether or not a link between neighboring gateways is available and uses the Dijkstra algorithm as the shortest network path search algorithm. In this case, the shortest distance is calculated for one origin node to all destination nodes.

Many other routing technologies or methods have also been proposed. For example, a third method disclosed in Japanese Patent Publication Kokai JP-A No. 2000-49852 modifies distance vector routing, described above as a first method, by incrementing the hop count each time an error packet is received that is generated at the termination of the search packet signal. That is, this method varies the path selection priority by increasing the distance vector.

Another method is disclosed in Japanese Patent Publication Kokai JP-A No. 2000-341199 as a fourth method. This fourth method selects a communication path using a plurality of pre-prioritized communication path information to build a network system. If an error occurs on any of the communication paths, data to which this error information is added is sent back to the source terminal. Upon receiving the error information, the source terminal checks its own path information to switch to the next highest-priority communication path to prevent communication efficiency from decreasing.

A still another method is disclosed in Japanese Patent Publication Kokai JP-A No. 2000-4469 as a fifth method. This fifth method is applied to a wireless communication system composed of a center station, a plurality of intermediary nodes, and a plurality of wireless terminals. In this method, the center station outputs the adjustment request signal, which is received by a wireless terminal via intermediary nodes. The wireless terminal sends back quality information such as the reception field strength and a bit error rates over radio waves. The plurality of intermediary nodes, which receive the radio waves from the wireless terminal, adds the radio wave reception quality information to the received radio waves and sends them to the center station.

SUMMARY OF THE DISCLOSURE

The Network State is more susceptible to change on a wireless communication path than on a wired communication path. For example, not only the strength of the electric field continuously changes as time goes on but also a phenomenon such as fading occurs. Fading refers to a fluctuation in a carrier frequency caused by radio waves affected by interferences such as reflection, diffraction, or scattering generated by building or trees. This state change sometimes results in a transmission or a reception error of data sent from the sending terminal to the receiving terminal. The degree of a transmission or reception error is represented as a bit error rates. A bit error rates, if higher than a predetermined rate, prevents communication from being performed and breaks the communication link. Thus, not only the communication transfer rate but also the bit error rate is an important factor in checking wireless communication quality.

Therefore, it is difficult to directly apply the proposals described above to local network such as an ad hoc network.

First, take a look at the first method. When calculating a vector distance only for a static network, there is no problem with this method. This is because creating a path table for all terminating ends is relatively easy. However, the first method is not applicable to a local network such as an ad hoc network described above. Each time a wireless terminal via which data is sent is changed to another wireless terminal in a local network, a plurality of path searches must be re-attempted as described above and, in addition, the path search processing takes long. Therefore, in such a network, it is not realistic to create a path table for all terminating ends.

Routing using a link state vector, given as the second method, covers the shortcomings of routing using a distance vector used in the first method. That is, the path search using link state vector checks if communication is possible with an adjacent gateway and, based on the result, creates a route map for calculating the shortest distance for each route. However, if a radio local network such as an ad hoc network, which has no dedicated gateway, is built using the second method, it becomes difficult to search for the best path. This is because, on a radio network in which the network quality changes in relatively short time, it is impossible to search for the best path based on link information only.

The third method, which is an application of the method using a distance vector, increments the hop count each time an error packet is received. Increasing the hop count and, thereby, decreasing the priority of a selection path for selecting the best route is efficient on a usual network. However, on a local network where the network quality is decreased in a relatively short time in the mobile environment, the best path cannot be selected simply by increasing the hop count to decrease priority as time goes on.

Next, consider the fourth method. The fourth method responds to a change in the communication state by switching the communication path to the next highest-priority communication path when an error occurs. However, the next highest-priority path information is priority information saved in advance. Therefore, when the network quality changes in a relatively short time as described above, the next highest-priority communication path selected based on the saved information is not always the best path at that time.

Finally, consider the fifth method. The fifth method performs routing processing with the use of field strengths and bit error rates to select a communication station of good communication quality during communication with a terminal via intermediary terminals. However, when this technology is applied to a network, such as an ad hoc network in which a wireless terminal also acts as an intermediary terminal, the communication mode becomes many-to-many rather than one-to-many. Therefore, the fifth method cannot be used for the route search.

Accordingly, it is an object of the present invention to provide a wireless terminal capable of quickly searching for the best route necessary for communication in a local network such as an ad hoc network.

The above and other objects are attained by a wireless terminal in accordance with a first aspect of the present invention, which comprises (a) weight value setting means for setting a weight value for each of plurality of communication paths, each having one end connected to a neighboring other terminal, said weight value being a reference value for selection when communication is performed over the communication paths;

(b) route search request relaying means, on receipt of a route search request from another terminal, said route search request issued for establishing a communication route to a predetermined terminal as a communication destination, with the weight value of communication paths, through which said route search request has passed, attached thereto, sending to a predetermined communication path the route search request with a weight value of the communication path attached thereto, said predetermined communication path being selected from among communication paths beginning at an own terminal and being connected to the own terminal based on the weight values of the communication paths;

(c) route deciding means that, receiving the route search request specifying the own terminal as the communication destination, for deciding a best route based on the weight value of the communication paths through which the route search request has passed, said weight value being attached to the route search request; and (d) route search result notifying means for notifying the route decided by said route deciding means to a source terminal of the route search request.

In the wireless terminal according to the first aspect of the present invention, the weight value, which serves as a reference value for selection when communication is performed over the communication paths, is set for each of communication paths each of which has one end connected to a neighboring terminal. When a route search request is received from some other terminal for establishing a communication route to a predetermined terminal as a communication destination, some communication paths connected to this own terminal are selected based on the weight values. At the same time, the route search request is sent to the selected communication paths with the weight value of each of the selected communication paths added to the weight value of the preceding communication paths that is attached to the route search request. By sending the route search request in this way, the route search request is finally sent to the communication destination. When the route search request is received, the communication destination decides the best route based on the weight values of the communication paths via which the route search request has passed. The route search result notifying means notifies the communication-starting terminal of the decided route. As described above, the wireless terminal according to the first aspect of the present invention can decide the route when the route search request is sent to the destination terminal, thus speeding up route search processing. It also makes route search processing on the communication starting side easy.

The above and other objects are attained by a wireless terminal in accordance with a second aspect of the present invention, which comprises:

(a) bit error rate measuring means for measuring bit error rate of each of plurality of communication paths, each having one end connected to a neighboring other terminal;

(b) transfer rate setting means for setting a data transfer rate of each of the communication paths, each having one end connected to a neighboring other terminal,;

(c) weight value setting means for setting weight values based on measurement and setting contents of said bit error rate measuring means and said transfer rate setting means, the weight value being a reference value for setting a route for communication with a destination terminal over the communication paths;

(d) route search request sending means for sending a route search request with the weight value attached thereto, to each of the communication paths, each beginning at, and being connected to, an own terminal, when communication is started after selecting routes via which communication is performed with a predetermined destination;

(e) route search request relaying means, on receipt of the route search request with the weight value of communication paths, through which the route search request has passed, attached thereto, sending to a predetermined communication path the route search request with the weight value of the communication path attached thereto, said predetermined communication path beginning at the own terminal and being selected from among communication paths connected to the own terminal based on the weight values of the communication paths;

(f) route deciding means, on receipt of the route search request specifying the own terminal as a communication destination, deciding a best route based on the weight value of the communication paths through which the route search request has passed, said weight value being attached to the route search request;

(g) route search result notifying means for notifying the route decided by said route deciding means to a source terminal of the route search request; and (h) communication starting means for initiating communication for the communication destination according to the indicated route, when the notification sent by said route search result notifying means is received by the source terminal of the route search request.

According to the second aspect of the present invention, for each of the communication paths, each of which has one end connected to a neighboring terminal, the weight value is set as a reference value for selection when communication is performed over the communication paths. When setting the weight value, the measurement result of bit error rates of the communication paths, each of which has one end connected to this terminal, produced by the bit error measuring means and the setting result of data transfer rates of communication paths that is set by the transfer rate setting means for each of the communication paths each of which has one end connected to this terminal are used. The data transfer rate may also be decided through negotiation with the terminal at the other end of the communication path. The wireless terminal according to the second aspect of the present invention comprises route search request sending means. The route search request sending means is means that, when the wireless terminal starts communication after selecting routes via which communication is performed with a predetermined destination, sends a route search request, to which the weight value is attached, to each of the communication paths each of which begins at, and is connected to, this terminal. The route search request is sent to the communication destination via the communication paths. At this time, an intermediary terminal selects communication paths beginning at this terminal based on the weight values and, when the route search request is sent to a communication path, adds the weight value of that communication path. Upon receiving the route search request, the communication destination decides the best route based on the weight value of the communication paths through which the route search request has been sent. The route search result notifying means notifies the source of the route search request about the route decided by the route deciding means. Based on this, the communication starting means starts communication with the communication destination according to the modified route. As described above, in the second aspect of the present invention, the wireless terminal is able to decide a route when the route search request is sent to the destination, speeding up route search processing. The present invention also simplifies route search processing in the communication starting side. In addition, setting the weight value with the use of the bit error rate and the data transfer rate allows the wireless terminal to select a route satisfying the requirement for both communication speed and data reliability.

The above and other objects are attained by a wireless terminal in accordance with a third aspect of the present invention, which comprises:

(a) weight value setting means for setting a weight value for each of plurality of communication paths each having one end connected to a neighboring other terminal, said weight value being a reference value for selection when communication is performed over the communication paths;

(b) route search request sending means for sending a route search request with the weight value attached thereto, to each of the communication paths, each beginning at, and being connected to, an own terminal, when communication is started after selecting routes via which communication is performed with a predetermined destination;

(c) route search request relaying means, on receipt of the route search request by the own terminal, said route search request having the weight value of communication paths, through which the route search request has passed, attached thereto, sending to a predetermined communication path the route search request with the weight value of the communication path attached thereto, said predetermined communication path beginning at the own terminal and being selected from among communication paths connected to the own terminal based on the weight values of the communication paths;

(d) route deciding means, on receipt of the route search request specifying the own terminal as a communication destination by the own terminal, deciding a best route based on the weight value of the communication paths through which the route search request has passed, said weight value being attached to the route search request;

(e) route search result notifying means for notifying the route decided by said route deciding means to a source terminal of the route search request;

(f) communication starting means for initiating communication for the communication destination according to the indicated route, when the notification sent by said route search result notifying means is received by the source terminal of the route search request;

(g) data relaying means for sending data sent from the source terminal of the route search request after the route is decided, to a next communication path according to the route; and (h) communication unavailability notifying means, in the case of the communication path via which said data relaying means send data being unavailable, notifying a communication initiating terminal of the communication unavailability by using rest of the routes decided by said route deciding means.

According to the third aspect of the present invention, a weight value for each of communication paths each of which has one end connected to a neighboring terminal is set, wherein the weight value is a reference value for selection when communication is performed over the communication paths. When a route search request for setting a route for communication with a predetermined terminal is received from some other terminal, some communication paths connected to this terminal are selected based on the weight values and, at the same time, the route search request is sent to the selected communication paths with the weight value of the communication path added to the weight value of the communication paths through which the route search request has passed. By sending the route search request in this way, the route search request is finally sent to the communication destination. Upon receiving the route search request, the communication destination decides the best route based on the weight value of the communication paths through which the route search request has passed, wherein the weight value is attached to the route search request. The route search result notifying means notifies the communication-starting terminal of this route to cause the communication starting means to start communication. In some cases, for example, when some terminal on the route has moved after communication starts and data cannot be relayed, the data relaying means cannot use the communication route over which data is to be sent. In such a case, the communication unavailability notifying means notifies the communication-starting terminal of the condition using a route, on which the terminal that has moved is not included, so that the route may be reset as necessary. Again, in this case, the wireless terminal reduces the load of the terminal that will restart communication and allows it to take quick action.

The above and other objects are attained by a wireless terminal in accordance with a fourth aspect of the present invention, which is constituted by the wireless terminal according to any one of the first to third aspects of the present invention, in which the weight value attached to the route search request is an added-up value of the weight values of the communication paths beginning with the source of the route search request and wherein the route deciding means decides the best route based on a magnitude of the added-up value.

According to the fourth aspect of the present invention, the weight value attached to the route search request is the value produced by adding up the weight values of the communication paths through which the route search request has passed beginning with the source terminal. Thus, the length of data, such as packets, becomes shorter than when values are individually attached to data. The communication destination can easily judge the best route from the smallest or largest added-up value. When the weight values of communication paths are one or larger, multiplication may be used instead of addition.

The above and other objects are attained by a wireless terminal in accordance with a fifth aspect of the present invention, which is constituted by the wireless terminal according to any one of the first to third aspects of the present invention, in which the route search request relaying means selects the communication path except an already-selected communication path by referencing the route sent with the route search request and relays the route search request.

According to the fifth aspect of the present invention, when communication paths are selected, one after another, to set a route, an already-selected communication path is not selected again. This not only prevents a path, which will form a closed loop before reaching the communication destination, from being selected.

The above and other objects are attained by a wireless terminal in accordance with a sixth aspect of the present invention, which is constituted by the wireless terminal according to any one of the first to third aspects of the present invention, in which the route deciding means decides the best route based on the weight value as well as on a time required for the route search request to be received via each route.

According to the sixth aspect of the present invention, a practical route may be selected by considering a time actually required for a route search request and so on.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Preferred embodiments of the present invention will now be described in detail.

Figure 1:
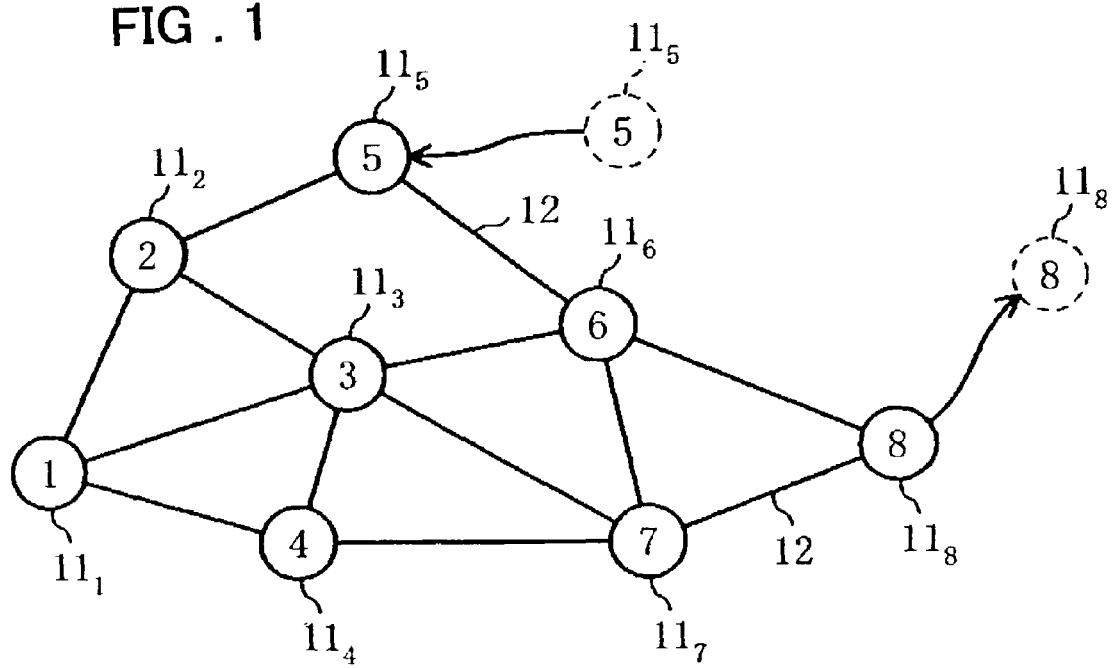
FIG. 1 is a diagram showing a state of a local network to which an embodiment of the present invention is applied.

FIG. 1 illustrates a local network to which terminals according to one embodiment of the present invention is applied. It is assumed that a plurality of wireless terminals $11_1$-$11_8$ are provided in a relatively limited area as shown in the figure. The numerals 1-8 in the circles (○), which indicate the terminals $11_1$-$11_8$, represent unique addresses of the terminals. This figure indicates the fifth wireless terminal $11_5$ has moved from somewhere else and has joined this local network. Each of the straight lines joining the wireless terminals $11_1$-$11_8$ indicates a link 12 between each two terminals. When the fifth terminal $11_5$ has joined this network, the link 12 is created for data communication with other wireless terminals 11 in the network. Conversely, for example, when the eighth wireless terminal $11_8$ has left the network, the link 12 is released at that time. Therefore, it is required for a wireless terminal 11, which has been in communication over the released line 12, to use another link 12.

Figure 2:
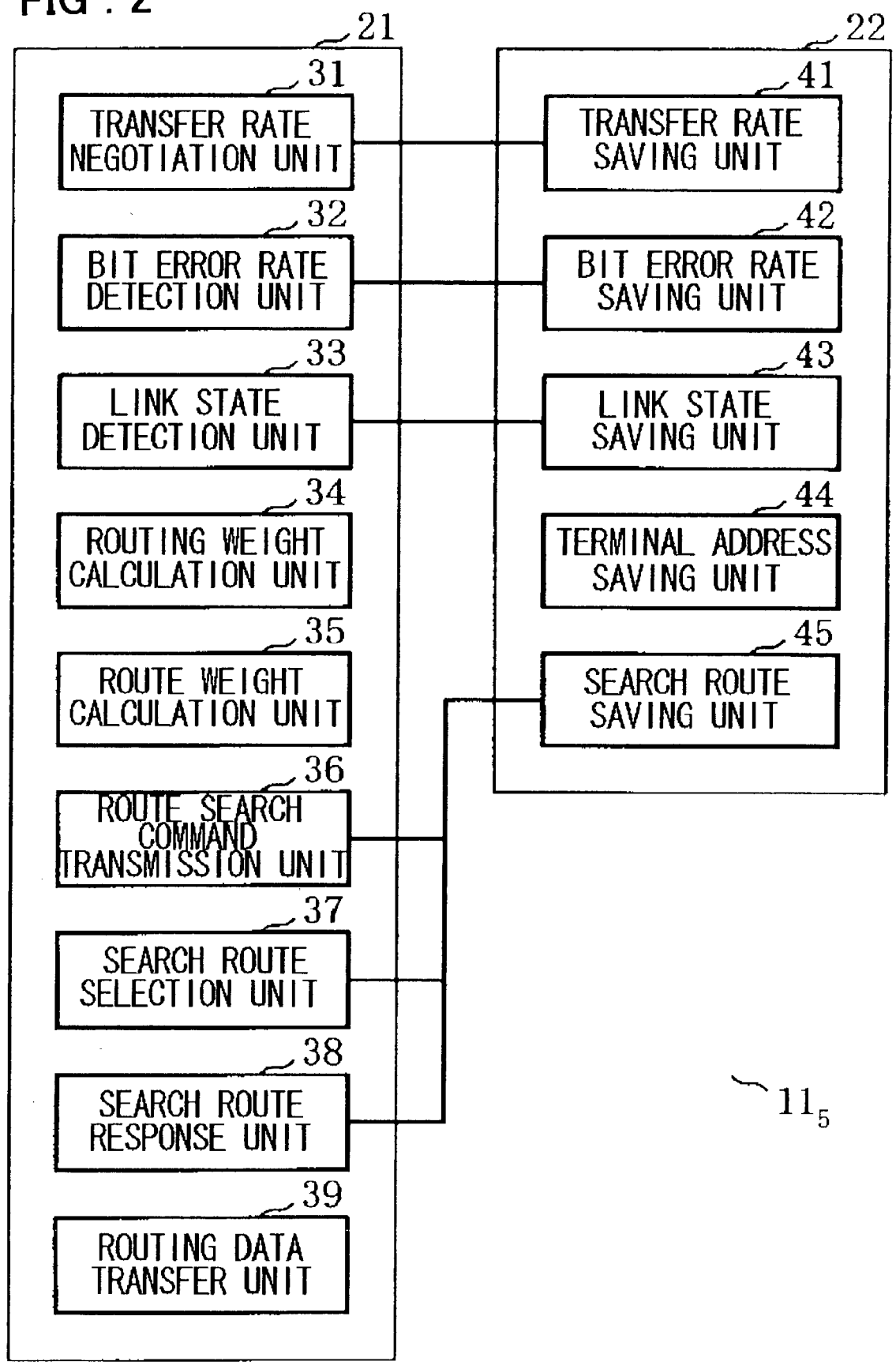
FIG. 2 is a block diagram showing the major components of the circuit configuration of a wireless terminal that joins the local network in the embodiment.

FIG. 2 shows the functional circuit configuration of a wireless terminal on the local network. The figure illustrates the circuit configuration of the fifth wireless terminal $11_5$. The functional configuration of the circuits of the first to fourth wireless terminals, $11_1$-$11_4$, and the sixth to eighth wireless terminals, $11_6$-$11_8$, is basically the same as the configuration shown.

The fifth wireless terminal $11_5$ comprises two major units: one is a parameter detection unit 21 and the other is a detection result saving unit 22. The parameter detection unit 21 detects parameters used for routing between any two terminals, that is, between the data sending terminal and the data receiving terminal, in a radio local network such as the one shown in FIG. 1. The detection result saving unit 22 is used to save the detected results. The parameter detection unit 21 comprises the following units: transfer rate negotiation unit 31 that negotiates the transfer rate with a terminal with which packets are to be transferred, bit error rate detection unit 32 that detects the bit error rate for communication with this terminal, link state detection unit 33 that checks if there is a link (connection) to a neighboring terminal, a routing weight calculation unit 34 that calculates a weight used for routing based on the detected bit rate and the transfer rate, route weight calculation unit 35 that sequentially adds up the weight result during routing, route search command transmission unit 36 that transmits a route search command used for searching for a route during communication, search route selection unit 37 that selects the terminals to which a route search command is to be issued, search route response unit 38 that returns the best route to a terminal from which the search command was issued, and routing data transfer unit 39 used by an intermediary terminal to transfer routing data from the source terminal to the destination terminal via a selected route.

The detection result saving unit 22 comprises the following units: transfer rate saving unit 41 used to save the transfer rate obtained as a result of negotiation by the transfer rate negotiation unit 31 in the parameter detection unit 21, bit error rate saving unit 42 used to save a bit error rate detected by the bit error rate detection unit 32, link state saving unit 43 used to save a current link state detected by the link state detection unit 33, terminal address saving unit 44 used to save the unique terminal address of the fifth wireless terminal $11_5$, which does not overlap any of the addresses of the first to fourth wireless terminals $11_1$-$11_4$ and the sixth to eighth wireless terminals $11_6$-$11_8$, as the terminal address, and search route saving unit 45 used to save the best route determined as a result of the search.

Figure 3:
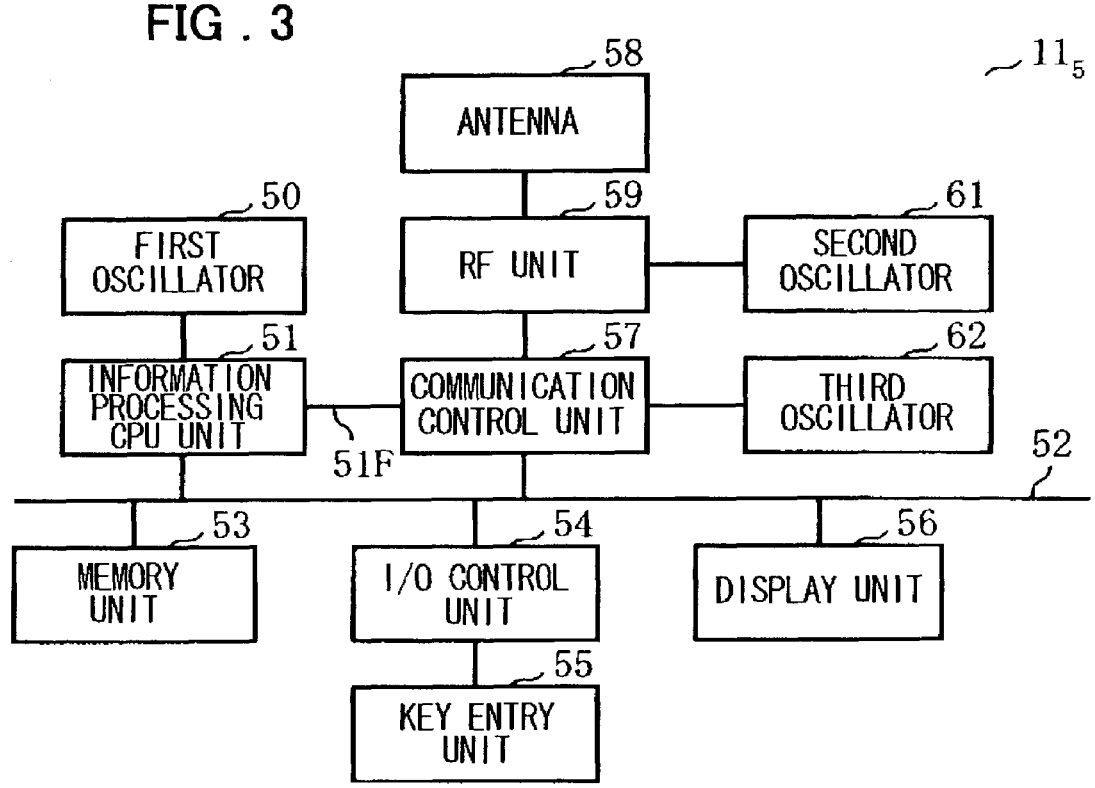
FIG. 3 is a block diagram showing the circuit configuration of a fifth wireless terminal.
Figure 4:
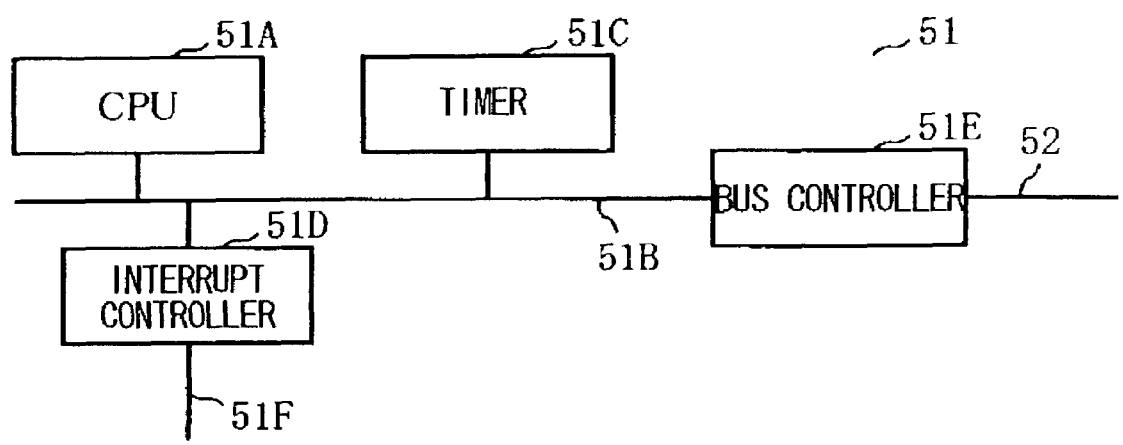
FIG. 4 is a block diagram showing the circuit configuration of a data processing CPU unit shown in FIG. 3.
Figure 5:
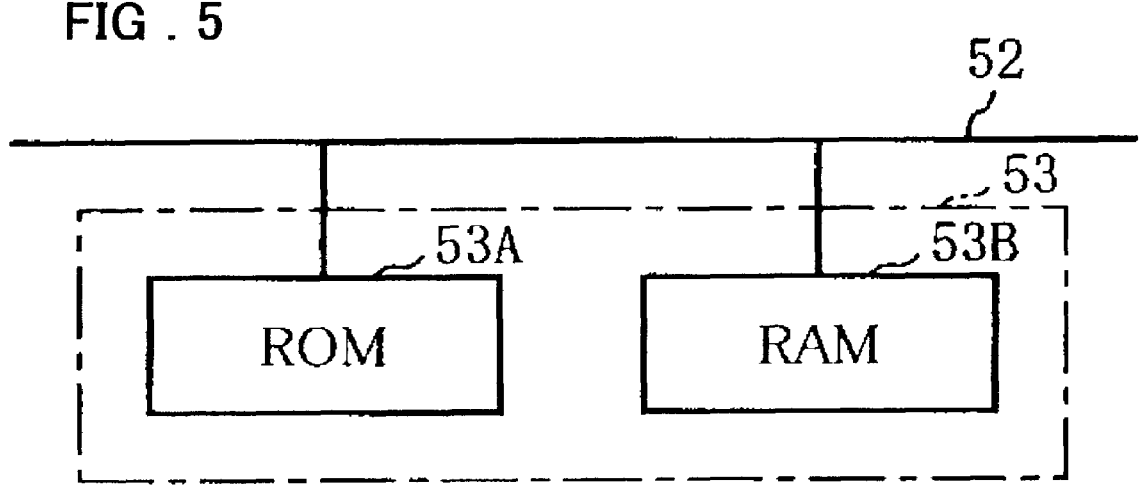
FIG. 5 is a block diagram showing the circuit configuration of a memory unit shown in FIG. 3.

FIG. 3 outlines the circuit configuration of the fifth wireless terminal that has the functional configuration described above. FIGS. 4 and 5 show the major parts of the circuit of the fifth wireless terminal more in detail. The circuit configuration of the first to fourth wireless terminals $11_1$-$11_4$ and sixth to eighth wireless terminals $11_6$-$111_8$ is basically the same as the configuration shown in those figures and, therefore, the description of the circuit configuration of those terminals is omitted.

As shown in FIG. 3, the fifth wireless terminal $11_5$ has an information processing CPU (Central Processing Unit) unit 51 that performs various control. As shown in FIG. 4, the information processing CPU unit 51 comprises a CPU (Central Processing Unit) 51A, a timer 51C connected to the CPU 51A via an internal bus 51B, an interrupt controller 51D, and a bus controller 51E. The interrupt controller 51D, which is connected to an interrupt control line 51F, accepts an interrupt to the CPU 51A. The timer 51C, which is made up of a time measurement hardware unit, may also be configured by software using a control program that counts clocks. The bus controller 51E connects the main bus 52 to the information processing CPU unit 51 to connect the information processing CPU unit 51 shown in FIG. 3 to other circuit devices.

Returning to FIG. 3, the information processing CPU unit 51 is connected to a first oscillator 50 from which the clock signal is supplied to the information processing CPU unit 51. The information processing CPU unit 51 is connected via the main bus 52 to the components within the terminal. A memory unit 53, one of the components, is composed of a ROM 53A and a RAM 53B as shown in FIG. 5. The ROM 53A is a read-only memory in which the control program executed by the CPU 51A shown in FIG. 4 and necessary permanent data are stored. The RAM 53B is composed of random access memory in which temporary data is stored, such as intermediate results or processing results produced by the CPU 51A during control program processing or route search processing.

An I/O (Input/Output) control unit 54 shown in FIG. 3, to which a key entry unit 55 is connected, performs the interface conversion between the key entry unit 55 and the main bus 52. The key entry unit 55 is a user interface via which the user initiates terminal search processing.

A display unit 56 displays visual data such as processing results. A communication control unit 57, which controls communication with other wireless terminals, is connected in this embodiment to a RF (Radio Frequency) unit 59 to which an antenna 58 is connected. The RF unit 59 amplifies and detects analog radio signals. The antenna 58 sends and receives analog radio signals. The RF unit 59 is connected to a second oscillator 61, and the communication control unit 57 is connected to a third oscillator 62. The second and third oscillators output predetermined signal outputs. The information processing CPU unit 51 is connected to, and controlled by, the interrupt control line 51F shown in FIG. 4 that performs necessary interrupt control.

The circuits in the detection result saving unit 22, such as the transfer rate saving unit 41, shown in FIG. 2 are configured using the areas in the RAM 53B in the memory unit 53. The parameter detection unit 21 is configured using the information processing CPU unit 51, RF unit 59, and so on.

Figure 6:
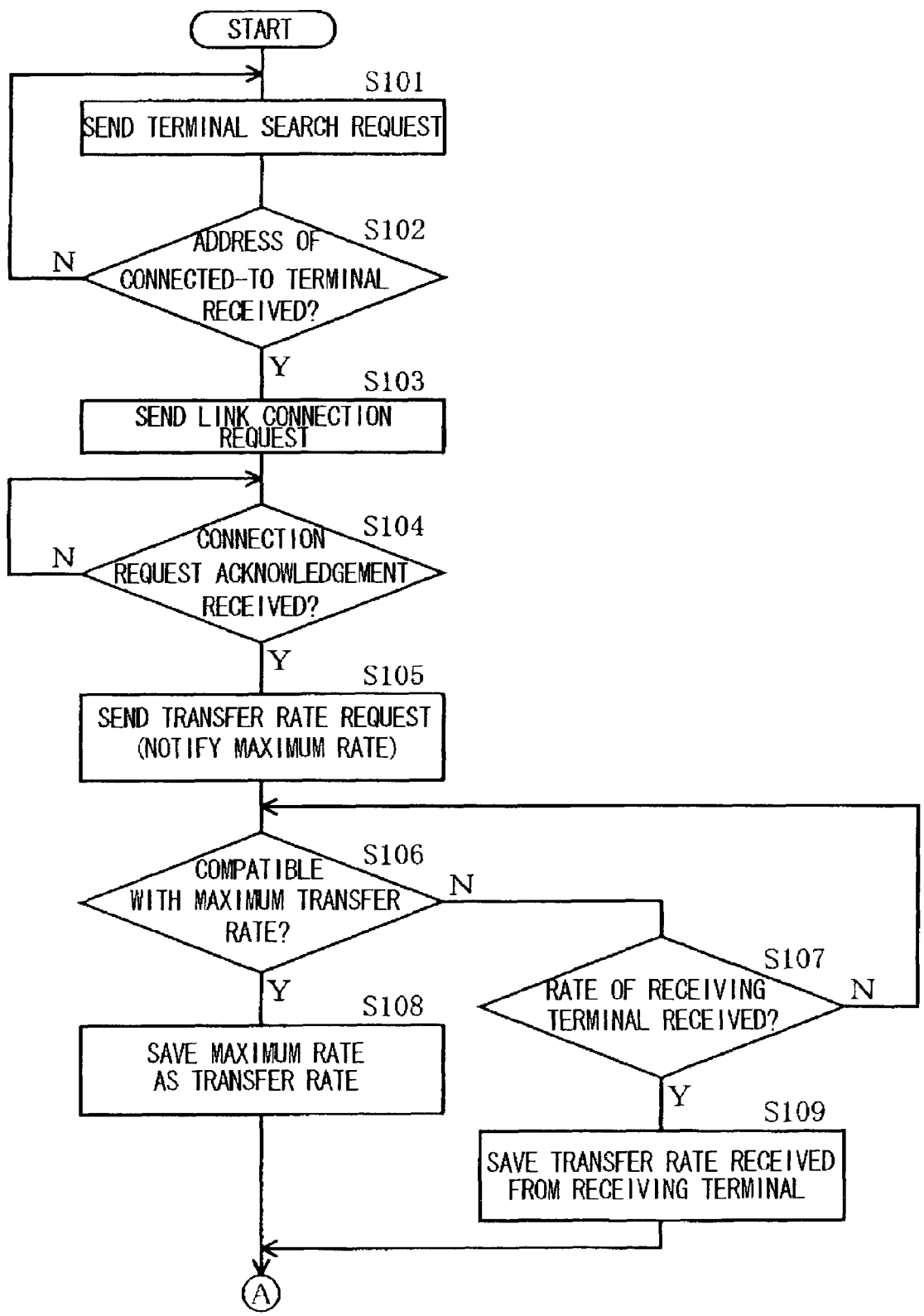
FIG. 6 is a flowchart showing the first half of the initial stage of processing when one wireless terminal joins the local network in the embodiment.
Figure 7:
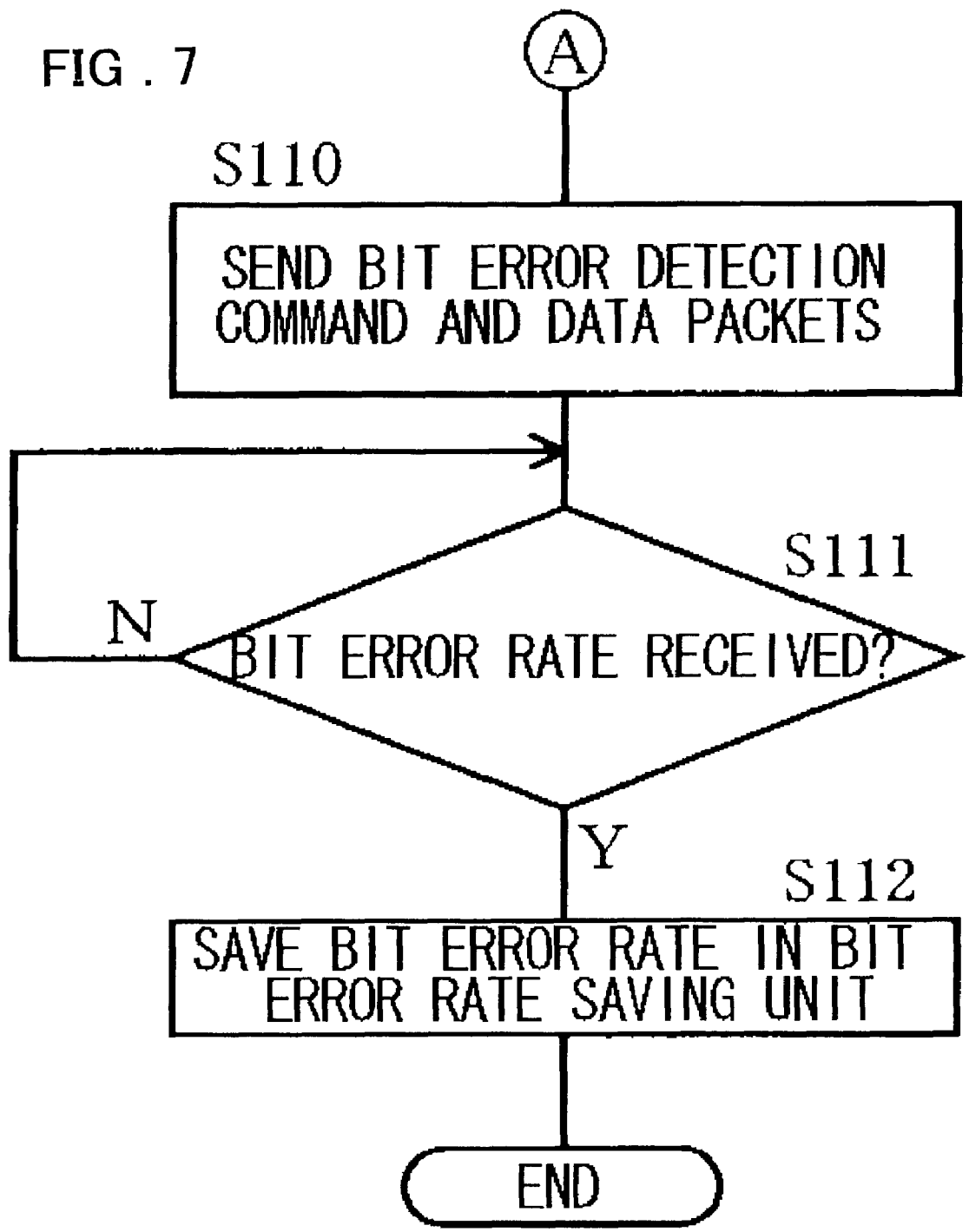
FIG. 7 is a flowchart showing the last half of the initial stage of processing when one wireless terminal joins a local network in the embodiment.

FIGS. 6 and 7 show the flow of processing in the initial stage in which a wireless terminal with the configuration described above joins one local network. As an example, assume that the sixth wireless terminal $11_6$ will join the local network to start communication with the first wireless terminal $11_1$. For example, the sixth wireless terminal $11_6$ will start an application that sends schedule data stored in the terminal to the first wireless terminal $11_1$. Of course, there is a case in which the sixth wireless terminal $11_6$ shown in FIG. 1 approaches the local network, composed of wireless terminals such as the fifth wireless terminal $11_5$, and joins this network for some reason.

In such a case, the sixth wireless terminal $11_6$ sends a terminal search request to near terminals, each capable of relaying packets to other terminals, and attempts to connect to the terminals. Even when the sixth wireless terminal $11_6$ attempts to communicate with the wireless terminal $11_1$, it first tries to connect to neighboring terminals, not the first wireless terminal $11_1$, in order to make the first wireless terminal $11_1$ start communication, because the route to the first wireless terminal $11_1$ is not known at this time. The sixth wireless terminal $11_6$ sends to those near terminals a request for connecting to the first wireless terminal $11_1$. This is because, if none of those terminals is the first wireless terminal $11_1$, the same request must be propagated to other terminals until finally the request reaches the first wireless terminal $11_1$.

First, the sixth wireless terminal $11_6$ sends the terminal search request to the neighboring terminals manually or automatically (step S101 in FIG. 6). The terminal search request includes the address of the sixth wireless terminal $11_6$ that is a connection requesting terminal. The manual search is performed when the user of the sixth wireless terminal $11_6$, who finds a community that forms the local network, makes the search intentionally to connect to the community. By contrast, the automatic search is performed when the sixth wireless terminal $11_6$ regularly makes the search at an interval based on the setting of the timer 51C shown in FIG. 4.

Figure 8:
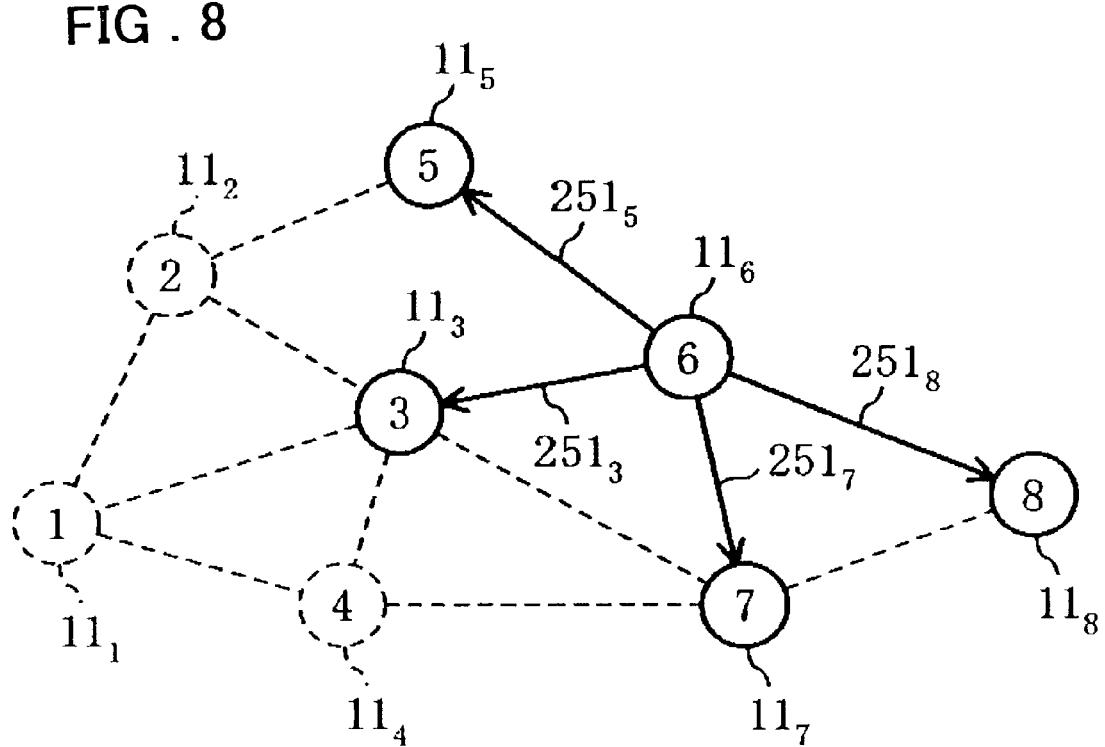
FIG. 8 is a diagram showing the state in which a sixth wireless terminal attempts to connect to neighboring terminals in the embodiment.

FIG. 8 shows how the sixth wireless terminal attempts to connect to neighboring wireless terminals. In this example, there are the fifth, third, seventh, and eighth wireless terminals, $11_5$, $11_3$, $11_7$, and $11_8$, in the range where the radio wave from the sixth wireless terminal $11_6$ reach. Therefore, in the example shown in FIG. 8, there is a possibility that a response will be received from those terminals. For simplicity, the following description assumes that a response is received from the fifth wireless terminal $11_5$.

In response to the terminal search request from the sixth wireless terminal $11_6$, the fifth wireless terminal $11_5$ sends as the connection acknowledgement the address of the connected-to terminal, that is, the address of the fifth wireless terminal $11_5$, to the sixth wireless terminal $11_6$ that is the connection requesting terminal (step S102 in FIG. 6). Upon receiving the address of the fifth wireless terminal $11_5$, the sixth wireless terminal $11_6$ finds the wireless terminal to which it will connect. Therefore, the sixth wireless terminal $11_6$ sends a link connection request to the obtained address to establish a communication link (step S103). In response, the fifth wireless terminal $11_5$ that is a connected-to terminal returns a connection request acknowledgement to the sixth wireless terminal $11_6$ (step S104).

Upon receiving this acknowledgement, the sixth wireless terminal $11_6$ sends a transfer rate request to negotiate the maximum transfer rate with the fifth wireless terminal $11_5$ (step S105). At this time, the sixth wireless terminal $11_6$ notifies the fifth wireless terminal $11_5$ of the maximum transfer rate compatible with the sixth wireless terminal $11_6$. In response to this notification, the fifth wireless terminal $11_5$ responds that it is compatible with the maximum transfer rate that is notified (step S106: Y). If the fifth wireless terminal $11_5$ is not compatible with the maximum transfer rate (N), the fifth wireless terminal $11_5$ notifies the sixth wireless terminal $11_6$ of the maximum transfer rate the fifth wireless terminal $11_5$ is comparable (step S107).

If the fifth wireless terminal $11_5$ responds that it can transfer data at the maximum transfer rate of the sixth wireless terminal $11_6$ (step S106: Y), the transfer rate negotiation unit 31 in the parameter detection unit 21 shown in FIG. 2 saves this rate in the transfer rate saving unit 41 in the detection result saving unit 22 (step S108). By contrast, if the fifth wireless terminal $11_5$ cannot transfer data at the transfer rate of the sixth wireless terminal $11_6$, the sixth wireless terminal $11_6$ receives the compatible transfer rate of the fifth wireless terminal $11_5$ (step S107: Y). In this case, the transfer rate saving unit 41 saves this transfer rate in the transfer rate saving unit 41 in the same way (step S109).

Figure 9:
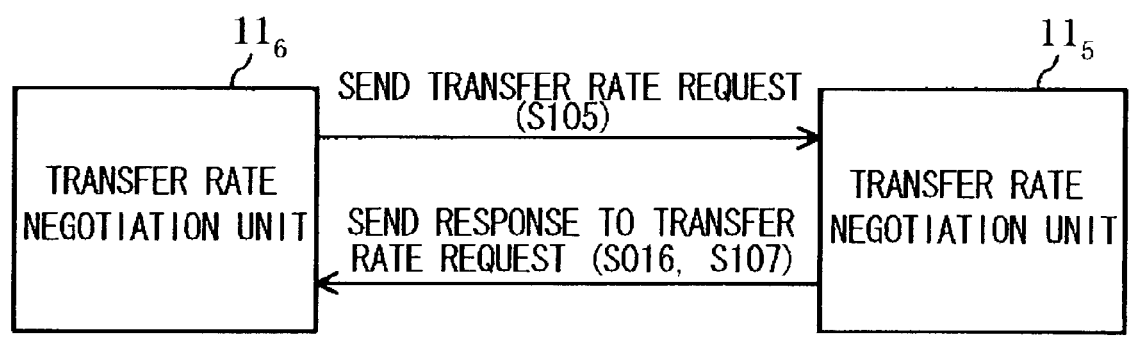
FIG. 9 is a diagram showing a transfer rate request and a response to the request transferred between two terminals in the embodiment.

FIG. 9 shows the transfer rate request and the response to it that are transferred between the two terminals. The sixth wireless terminal $11_6$ sends the transfer rate request (step S105 in FIG. 9) and the fifth wireless terminal $11_5$ responds to the request (steps S106 and S107 in FIG. 9).

After a link over which the sixth wireless terminal $11_6$ will start communication and the maximum transfer rate of the link are found, the CPU in the information processing CPU unit 51 (FIG. 3) performs bit error detection processing for a terminal (for example, fifth wireless terminal $11_5$) to which a link may be created. More specifically, the bit error detection command and the predetermined data packets containing checking data for detection are sent to the fifth wireless terminal $11_5$ to which the link is established (step S110 in FIG. 7).

Predetermined data packets used as checking data will be described below more in detail. The data packets, which are sent with the bit error detection command for detecting a bit error rate, are composed of a predetermined number of packets containing particular bit arrays (bit patterns) predetermined among local networks. Each wireless terminal 11 in the local network has the same data packets, or has a pattern or an expression used to derive the data packets, for use as comparison packets in its ROM. Therefore, each terminal can detect the error generation ratio of the route from the sixth wireless terminal $11_6$ to the wireless terminal 11, such as the fifth wireless terminal $11_5$ that is the next terminal, by receiving the data packets sent with the bit error rate detection command and comparing the received data packets with the comparison packets.

The bit pattern for calculating the bit error rate is detected by the bit error rate detection unit 32, shown in FIG. 2, of the fifth wireless terminal $11_5$. The bit error rate detection unit 32 compares the bit pattern in the specified number of packets with the bit pattern in the comparison packets, one at a time, and counts the number of error bits. The number of errors counted in this way is divided by the total number of bits in the data packets to calculate the error generation ratio.

The bit pattern in the data packets used for bit error calculation is designed such that the bit string is not arranged in a particular sequence inappropriate for detection. To create such a bit pattern, a random bit string generator such as an M-sequential data generator is used. The M-sequential data generator allows each wireless terminal 11, which has in itself a polynomial for generating a bit pattern and a pattern used as the seed (or a base) of the polynomial, to generate a random bit pattern common to the wireless terminals. This eliminates the need for each wireless terminal 11 to have a bit pattern for bit error calculation.

After calculating the bit error rate for the data packets in the above example, the fifth wireless terminal $11_5$ sends the calculated bit error rate back to the sixth wireless terminal $11_6$ from which the bit error detection command was received. The sixth wireless terminal $11_6$ waits for this bit error rate to be received (step S111 in FIG. 7). When the bit error rate is received (Y) by the sixth wireless terminal $11_6$, the bit error rate is associated with the terminal (fifth wireless terminal $11_5$ in this example), to which the bit error detection command was sent, and saved in the bit error rate saving unit 42 shown in FIG. 2 (step S112 in FIG. 7).

Figure 10:
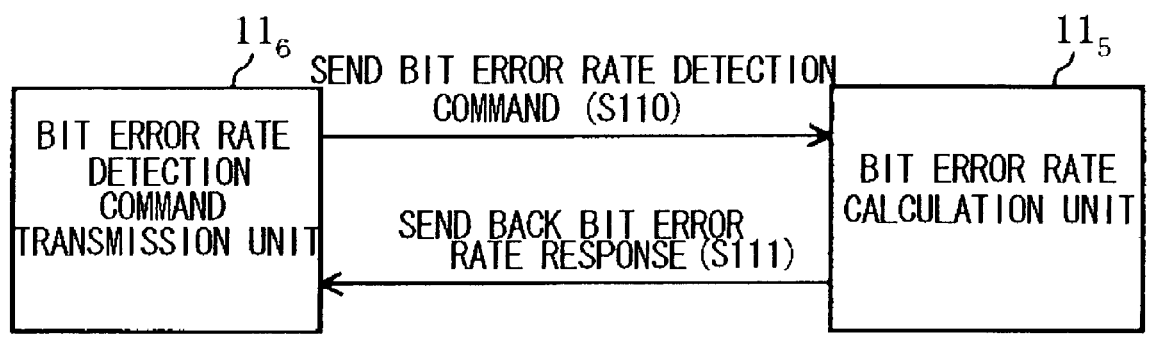
FIG. 10 is a diagram showing a bit error rate detection command and a response to the command transferred between two terminals in the embodiment.

FIG. 10 shows how the bit error rates detection command and the response to it are sent and received between the two terminals. The sixth wireless terminal $11_6$ sends the bit error rate detection command (step S110 in FIG. 10), and the fifth wireless terminal $11_5$ sends the response to it (step S111 in FIG. 10).

Bit error rate detection processing described above is performed for the fifth, third, seventh, and eighth wireless terminals $11_5$, $11_3$, $11_7$, and $11_8$ shown in FIG. 8 as indicated by the arrows $251_5$, $251_3$, $251_7$, and $251_8$, and the result is saved in the bit error rate saving unit 42. The link state of the fifth, third, seventh, and eighth wireless terminals $11_5$, $11_3$, $11_7$, and $11_8$, to which the link is set at this time, is saved in the link state saving unit 43.

Figure 11:
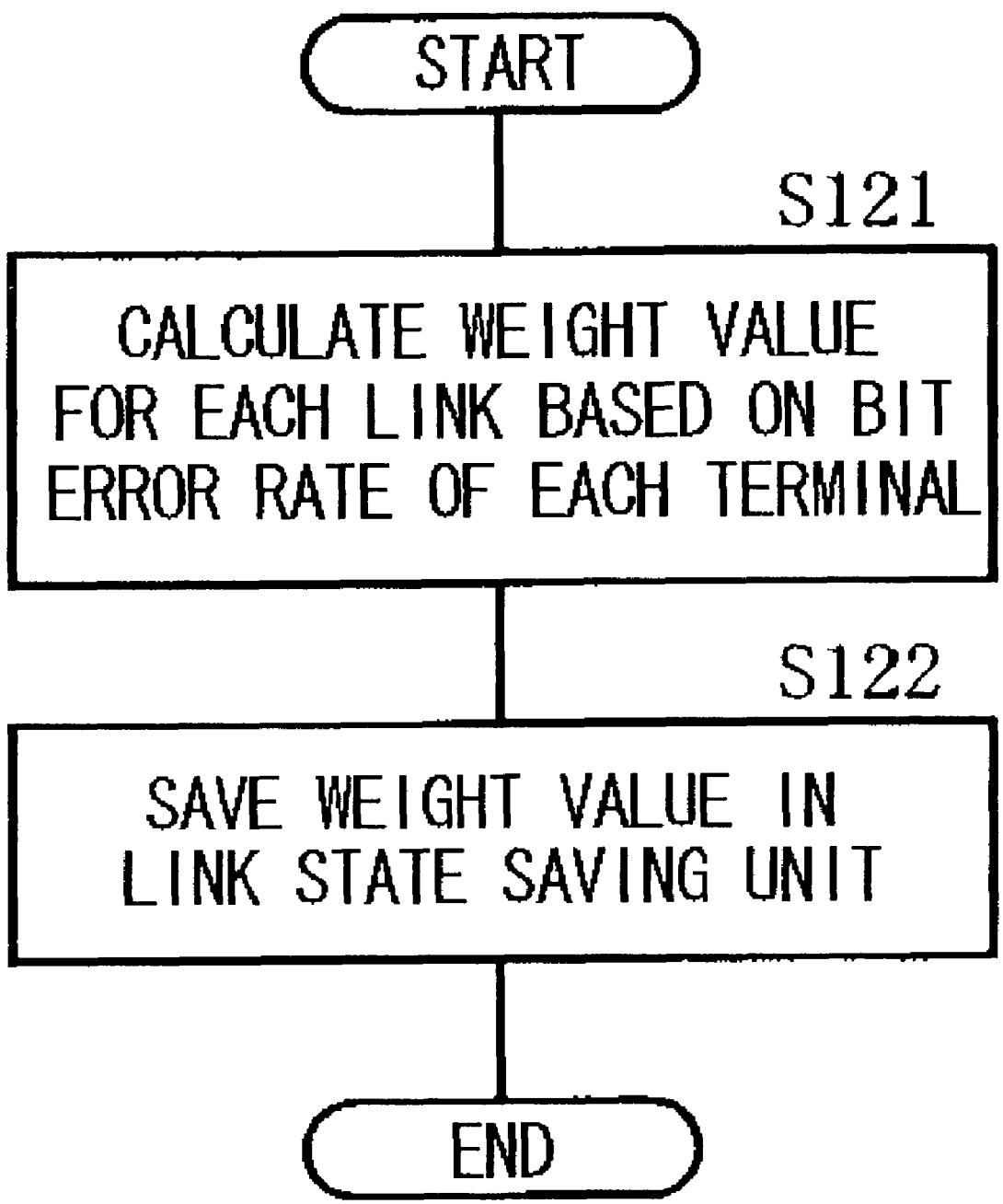
FIG. 11 is a flowchart showing link weighting processing, which is executed after the processing in FIG. 6, between a terminal that has joined the local network and neighboring terminals.

FIG. 11 shows the flow of link weighting processing performed after the processing shown in FIG. 6. This link weighting processing is performed between the terminal that has joined the local network and each of the terminals near to that terminal. For example, for each of the fifth, third, seventh, and eighth wireless terminals $11_5$, $11_3$, $11_7$, and $11_8$ to which the link has been created, the sixth wireless terminal $11_6$ shown in FIG. 8 sets a weight on each link as the data required for setting a communication or relay route. When setting the weights, the bit pattern rates of the link to the fifth, third, seventh, and eighth wireless terminals $11_5$, $11_3$, $11_7$, and $11_8$ are used (step S121 in FIG. 11).

The fifth, third, seventh, and eighth wireless terminals $11_5$, $11_3$, $11_7$, and $11_8$ are also required to create a link to the sixth wireless terminal $11_6$ that has joined and, at the same time, set a weight on the link for use in routing. In setting a route weight, the fifth, third, seventh, and eighth wireless terminals $11_5$, $11_3$, $11_7$, and $11_8$ can set a weight using the bit error rate calculated by those terminals for the sixth wireless terminal $11_6$.

If this calculation is executed for each terminal each time a request is made, the calculated route weight value is used for setting a route as will be described later. Therefore, the calculated route weight value need not be saved. In some wireless communication system, the route weight value is calculated regularly for each link and the calculated result is stored in the link state saving unit 43 (step S122 In FIG. 11).

The root weight value, RootW, is calculated by the following equation (1).

$$RootW = BER*BWK + 1/TrRate*TWK \quad (1)$$

In the above equation, BER is a bit error rates, BWK is the weighting coefficient of the bit error rate, TrRate is a packet transfer rate, and TWK is the weighting coefficient of the transfer rate. The symbol * indicates a multiplication. It would be more efficient that the weighting coefficients BWK and TWK in the equation (1), though dependent on the operation circuit of the wireless terminal 11, are precise enough to prevent the significant digits from being cancelled.

When setting the weighting coefficients BWK and TWK, it would be more efficient to determine the values based on what purpose the local network will be used for. For example, for a local network where the effect of the bit error rate on the communication quality is considered important, the weighting coefficients BWK and TWK should be set such that BER*BWK in the equation (1) is larger than 1/TrRate*TWK.

The weighting coefficients BWK and TWK may be saved in a predetermined location in the detection result saving unit 22 shown in FIG. 2 or may be set in the equation (1) for calculation when a route search is made which will be described below.

Figure 12:
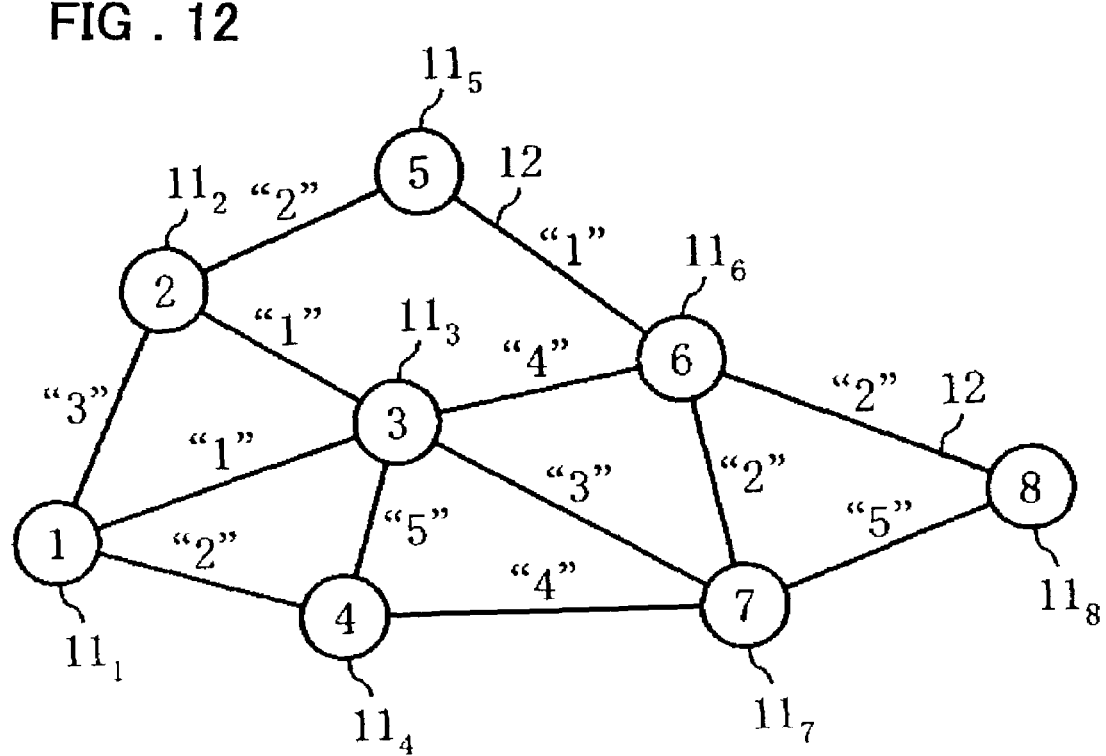
FIG. 12 is a diagram showing the state of the local network and route weight values at a particular point in the embodiment.

FIG. 12 shows the state of the local network, as well as the route weight values, at a particular time. This figure shows the state of the local network after the sixth wireless terminal $11_6$ shown in FIG. 8 has joined the local network. As in the FIG. 1, the numerals 1-8 in circles (○) represent the terminal address unique to each terminal, and the numeric values 1-5 on the links 12 among the wireless terminals 11 represent the route weight value.

Figure 13:
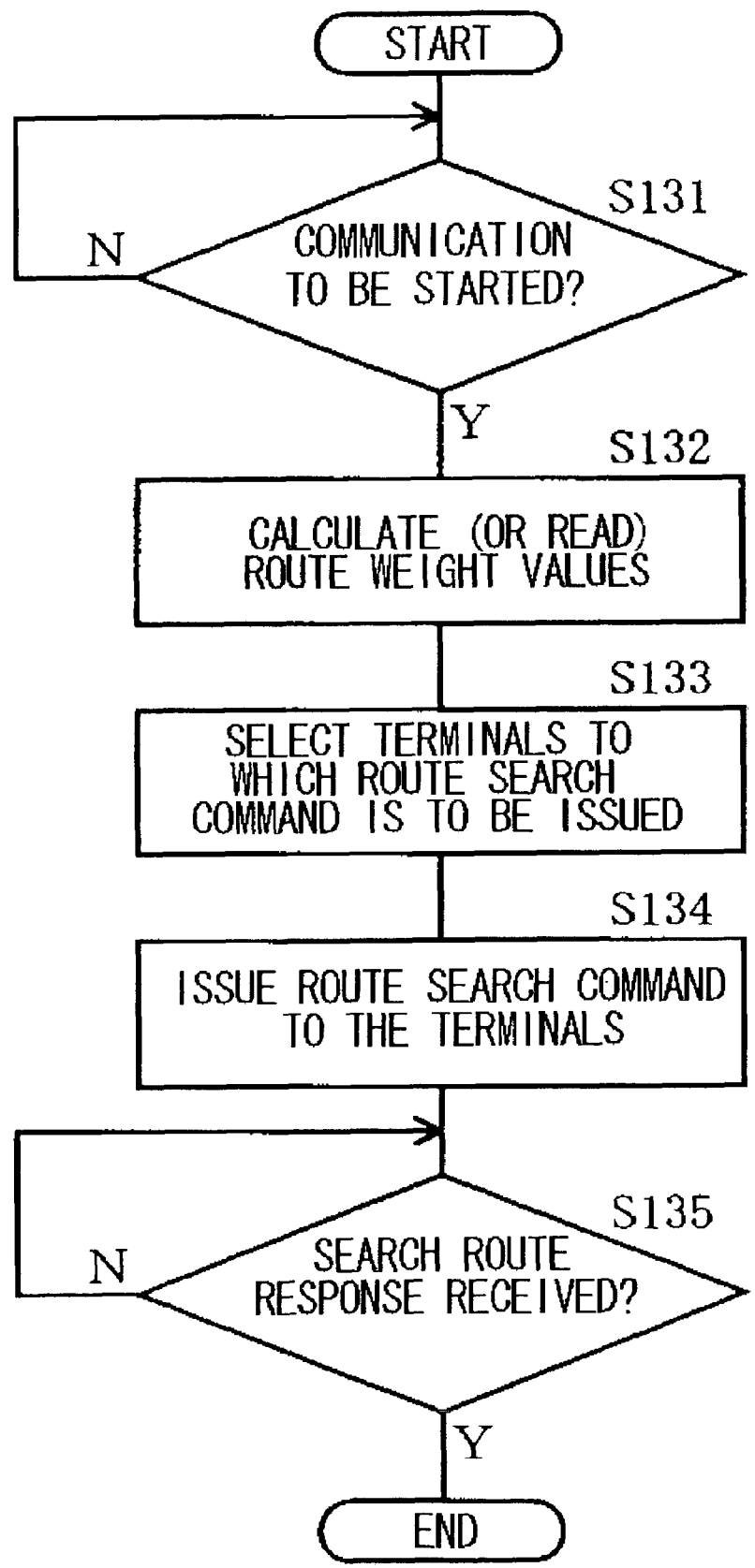
FIG. 13 is a flowchart showing the flow of processing executed in this embodiment by a terminal, which starts communication, to decide a route.

FIG. 13 shows the flow of processing executed by a terminal to decide a route before the terminal starts communication. In the description below, it is assumed that the first wireless terminal $11_1$ in FIG. 12 starts wireless communication with the eighth wireless terminal $11_8$. For example, the first wireless terminal $11_1$ will send schedule data to the eighth wireless terminal $11_8$ as described above. Upon receiving a communication start request (step S131: Y in FIG. 13), the first wireless terminal $11_1$, which starts data communication, sends the route search command. As described above, before issuing the route search command, the first wireless terminal $11_1$ has already performed transfer rate negotiation and bit error detection for each of the neighboring second, third, and fourth wireless terminals $11_2$, $11_3$, and $11_4$; the first wireless terminal $11_1$ has already saved the maximum transfer rates and the bit error rates in the transfer rate saving unit 41 and the bit error rate saving unit 42 to update those values to the latest values.

The first wireless terminal $11_1$ uses the transfer rate and the bit error rate to calculate the route weight value of each of the second, third, and fourth wireless terminals $11_2$, $11_3$, and $11_4$ (step S132 in FIG. 13). In the description below, a smaller route weight value means a better route search. In case the CPU in the information processing CPU unit 51 (FIG. 3) in the first wireless terminal $11_1$ regularly calculates the route weight values and saves the resulting values in a predetermined location in the detection result saving unit 22, the contents of the area may be read instead of calculating the values.

After calculating the route weight values, the first wireless terminal $11_1$ checks the neighboring second, third, and fourth wireless terminals $11_2$, $11_3$, and $11_4$ based on the calculated values to select a terminal to which the route search command is to be issued (step S133 in FIG. 13). In this embodiment, the number of these wireless terminals 11 are to be narrowed down to two. Thus, the terminal with the smallest route weight value and the terminal with the next smallest route weight values are selected.

After selecting the two terminals, which satisfy the conditions, as the terminals to which the route search command is to be issued (step S133 in FIG. 13), the route search command is issued to those wireless terminals 11 which act as intermediary terminals (step S134 in FIG. 13). The wireless terminal 11 acting as an intermediary terminal repeats the same procedure to send the route search command to the next wireless terminal 11. As a result, the route to the eighth wireless terminal $11_8$ is finally decided. Then, the first wireless terminal $11_1$, which issued the command, waits for the search route response to be received from the neighboring wireless terminal 11 (step S135 in FIG. 13). This response is the result sent back from the eighth wireless terminal $11_8$ via intermediary terminals. After that, data communication between the first wireless terminal $11_1$ and the eighth wireless terminal $11_8$ is executed in this example.

In the above description, the search route selection unit 37 shown in FIG. 1 selects the terminals to which the route search command is to be issued. This is described using the example shown in FIG. 12. Among the second, third, and fourth wireless terminals $11_2$, $11_3$, and $11_4$ all of which are neighboring terminals of the first wireless terminal $11_1$, the third wireless terminal $11_3$ with the weight value of 1 is the terminal with the smallest route weight value. The terminal with the next smallest route weight value is the fourth wireless terminal $11_4$ with the route weight value of 2. Thus, the first wireless terminal $11_1$ issues the route search command to those two radios terminal $11_3$ and $11_4$.

Similarly, the third wireless terminal $11_3$ attempts to issue the route search command to the terminals with the smallest and the next smallest route weight values, that is, the first wireless terminal $11_1$ and the second wireless terminal $11_2$. However, the first wireless terminal $11_1$ is the terminal whose route has already been selected. Therefore, the first wireless terminal $11_1$ is removed from the candidates. As a result, the third wireless terminal $11_3$ issues the route search command to the second wireless terminal $11_2$ and the seventh wireless terminal $11_7$. Similarly, the fourth wireless terminal $11_4$ attempts to issue the route search command to the terminals with the smallest and the next smallest route weight values, that is, the first wireless terminal $11_1$ and the seventh wireless terminal $11_7$. However, the first wireless terminal $11_1$ is the terminal whose route has already been selected. Therefore, the first wireless terminal $11_1$ is removed from the candidates. As a result, the fourth wireless terminal $11_4$ issues the route search command to the seventh wireless terminal $11_7$ and the third wireless terminal $11_3$. The terminals to which the route search command is issued are sequentially selected in the same way.

Figure 14:
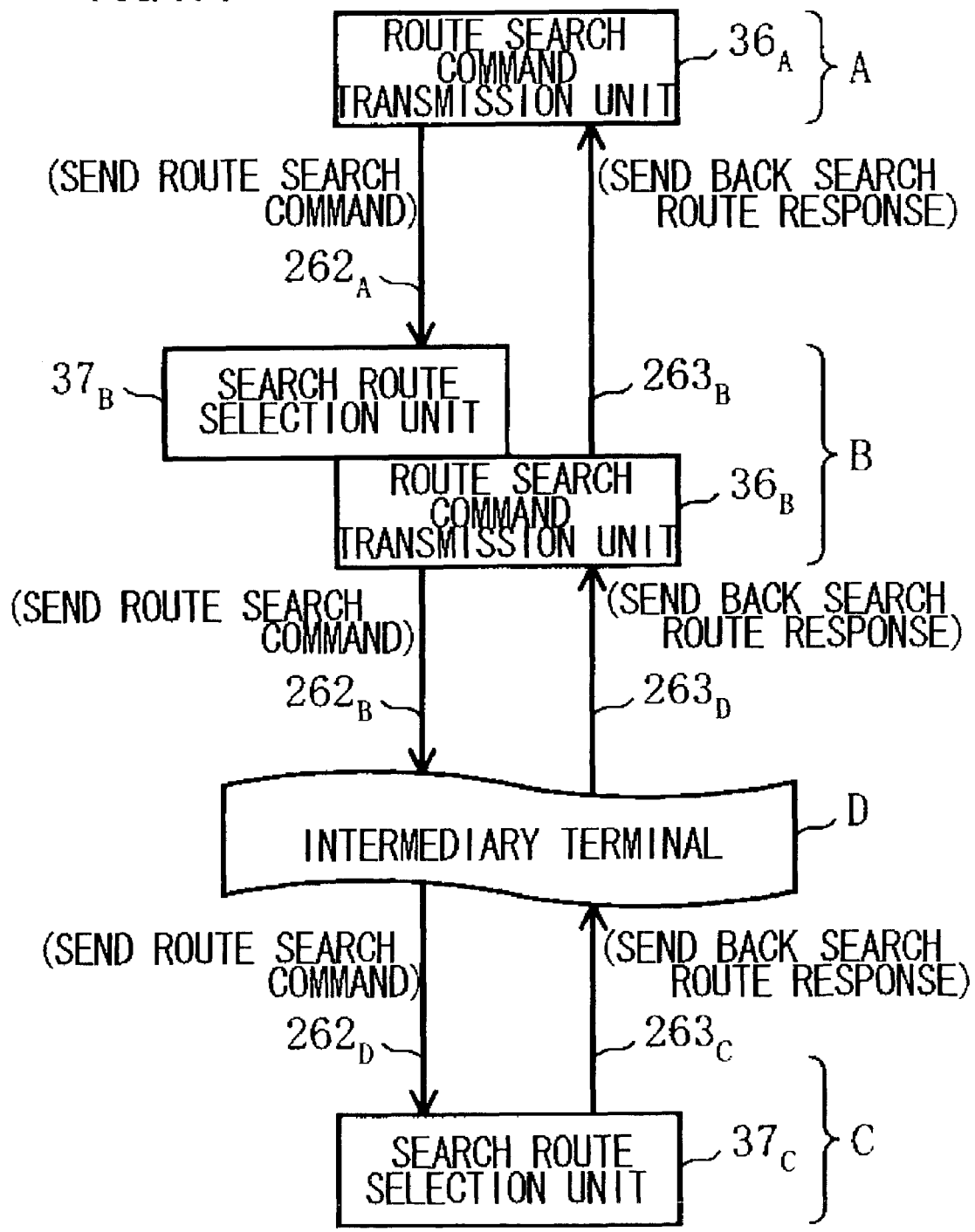
FIG. 14 is a diagram showing, in a generalized form, how a route is established in this embodiment between a communication requesting terminal and a terminal at the other end of the line.

FIG. 14 shows, in a generalized format, how a route is set between a communication requesting terminal and a terminal at the other end of the line. In the figure, a terminal that is going to start communication (first wireless terminal $11_1$ in the example given above) is the source terminal A, and the subscript A is used to represent its circuits devices, and so on. A neighboring terminal to which the source terminal A issues the route search command (one of second, third, and fourth wireless terminals $11_2$, $11_3$, and $11_4$) is the neighboring terminal B, and the subscript B is used to represent its circuits devices, and so on. In addition, a terminal at the other end of the line (eighth wireless terminal $11_8$ in the above example) is the destination terminal C, and the subscript C is used to represent its circuits devices, and so on. The terminals between the neighboring terminal B and the destination terminal C are represented collectively as intermediary terminals D.

The route search command transmission unit $36_A$ of the source terminal A sends the route search command $262_A$ to the neighboring terminal B. The search route selection unit $37_B$ of the neighboring terminal B selects, from the neighboring wireless terminals 11, the two terminals to which the route search command is to be issued with the terminal itself as an origin node. At this time, a terminal to be selected must not be the one already selected. Based on this condition, the route search command transmission unit $36_B$ of the neighboring terminal B creates a route search command $262_B$ and sends it to the intermediary terminals D. Similarly, the route search command $262_D$ is sent from the last intermediary terminal D to the search route selection unit $37_C$ of the destination terminal C.

The destination terminal C receives the route search command $262_D$ from several terminals. The destination terminal C selects the best or optimized route using the method, which will be described later, and sends the search route response $263_C$, which represents the route, back to the intermediary terminals D via the same route. The intermediary terminal D sends the response to the neighboring terminal B. Upon receiving the search route response $263_D$, the neighboring terminal B sends it to the route search command transmission unit $36_A$ of the source terminal A as the search route response $263_B$. In this way, the source terminal A knows the best route between the source terminal A and the destination terminal C and starts communication with the destination terminal C along the decided route. The route search command transmission unit 36 is equipped with not only send function but also receive function of the command.

In a wireless communication system using wireless terminals in this embodiment, the eighth wireless terminal $11_8$, which is the destination terminal C, finally selects a route and returns the selected route to the first wireless terminal 11 which is the source terminal A. To do so, the route weight calculation unit 35 shown in FIG. 2 is used.

Returning to FIG. 14, the route search command $262_D$ sent to the search route selection unit $37_C$ of the destination terminal C includes not only the address of the destination terminal C with which data communication is to be established but also the address of the source terminal A that is the source terminal of data packets, the addresses of the neighboring terminal B and intermediary terminals D via which the command has passed in order to search for the route, and information on the added-up weight value of the route via which the command has passed. The address data included in the route search command $262_D$ is composed of the address of the source terminal, followed by the sequentially-arranged addresses of the neighboring terminal B and intermediary terminals D, followed by the address of the destination terminal C to which the command is sent. Therefore, the delivery route of the route search command $262_D$ may be easily determined by reading a sequence of these addresses.

Figure 15:
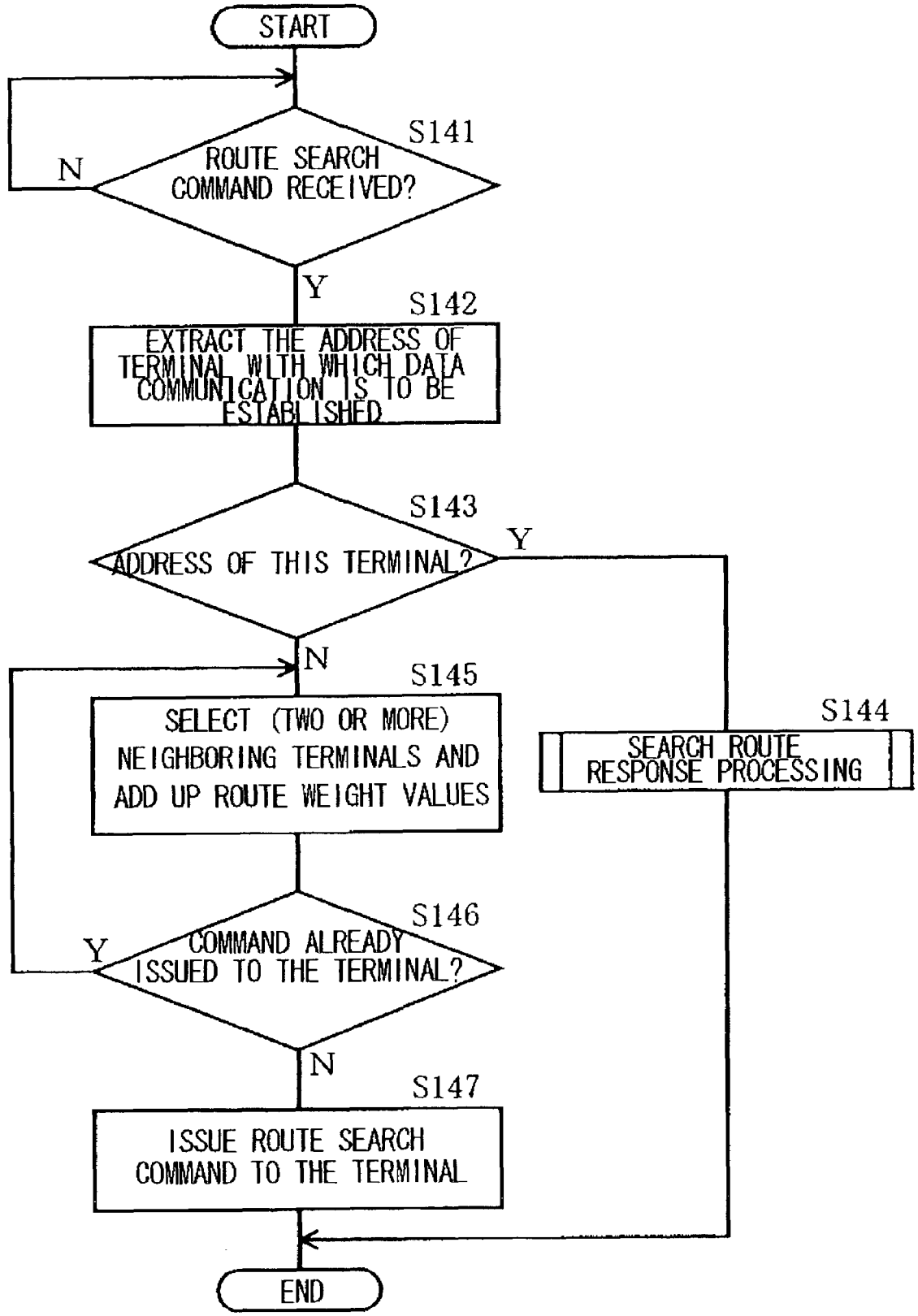
FIG. 15 is a flowchart showing a procedure used by each terminal in this embodiment to process a route search command that has been received.

FIG. 15 shows the procedure provided for each terminal to process the route search command sent to that terminal. First, the wireless terminal 11 waits for the route search command to be received (step S141 in FIG. 15). Upon receiving the route search command (Y), the terminal extracts the address with which data communication is to be established (destination terminal) (step S142). If the address is the address of the own terminal itself (step S143: Y), the wireless terminal 11 is the eighth wireless terminal $11_8$ that is the destination terminal in this example. In this case, the terminal performs search route response processing that will be described later (step S144).

In this example, if the address is not the address of the eighth wireless terminal $11_8$ that is the destination terminal (step S143: N), the receiving terminal selects a plurality of neighboring wireless terminals 11 (two terminals in this embodiment) to relay the route search command (step S145). The selected terminals are those with small route weight values. The route weight value included in the received command is added to the route weight value of the selected wireless terminal 11. When the wireless terminal 11 on the next path is selected as described above, a check is made if the wireless terminal 11 is on the route already selected during the same route search processing (step S146). This checking is made to prevent the route, which will be formed by the intermediary terminal 11 during the selection of the next wireless terminal 11, from forming a closed loop. If a terminal to which the route search command has already been sent is included, the route to that terminal is removed and the wireless terminal 11 with the next smallest route weight value is added.

As described above, the wireless terminal 11 that has received the route search command issues the route search command to the terminal that is selected in step S145 (step S147 in FIG. 15). The number of wireless terminals 11 to which the route search command is issued is basically increased in a network where many intermediary paths are included. This is because each wireless terminal 11 that performs the processing shown in FIG. 15 issues the route search commands to a plurality of terminals.

Figure 16:
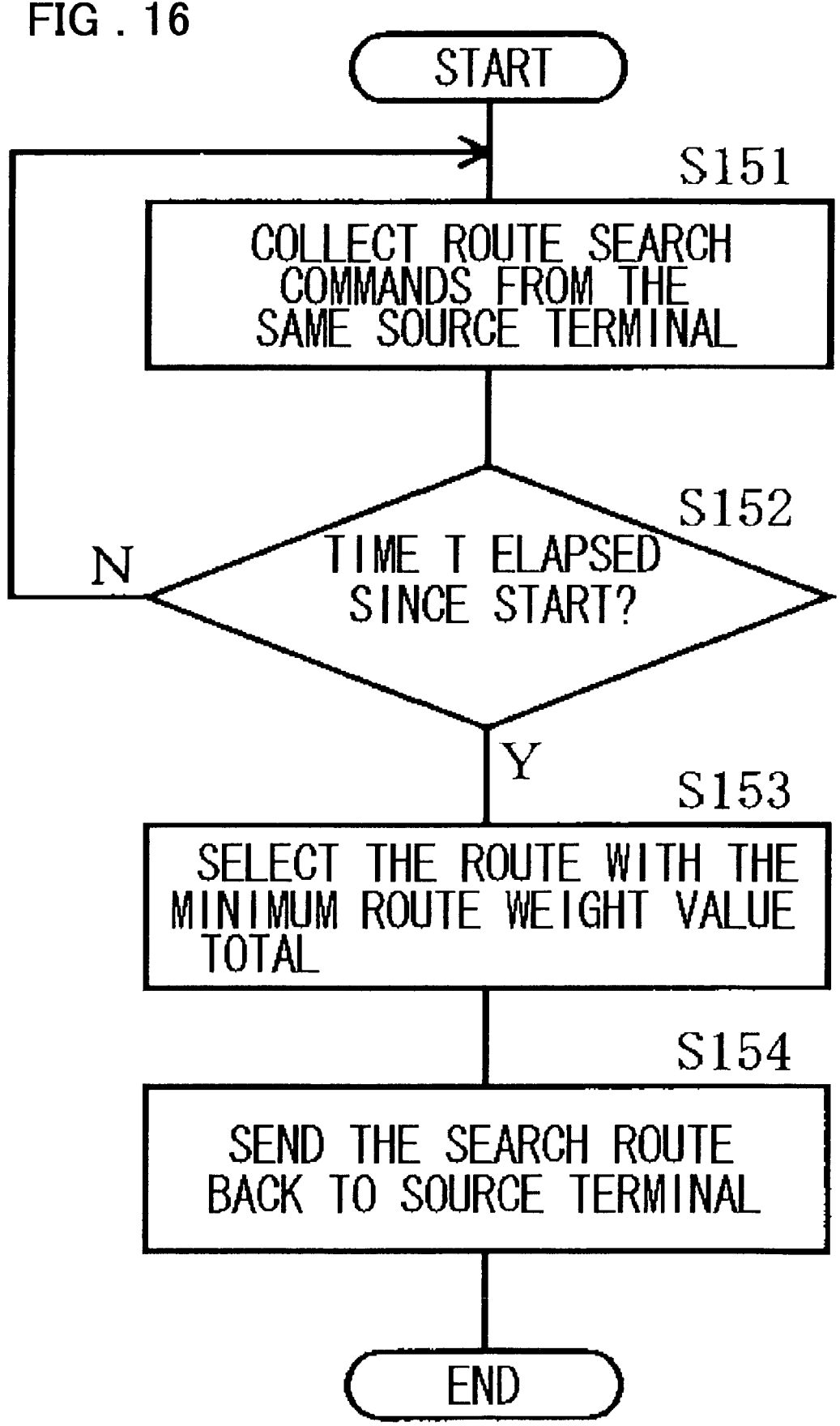
FIG. 16 is a flowchart showing the flow of search route response processing executed by a destination terminal shown in step S144.

FIG. 16 shows search route response processing executed by the destination terminal in step S144. Although the eighth wireless terminal $11_8$ is the destination terminal in this embodiment, the destination terminal may be any wireless terminal 11 included in the local network. The wireless terminal 11 collects the route search commands issued from the same source terminal (step S151). The wireless terminal 11 continues collecting route search commands from the same source terminal until a predetermined time t, which is decided by considering the local network propagation time, elapses since the source terminal first issued the route search command (step S152). Note that the time t need not take into consideration the time required for the route search command to travel via the worst (longest) route. This is because the purpose of the route search is to select a good route. For this reason, instead of waiting for the period of t, collecting the route search commands may be terminated when the number of route search commands from the same source terminal reaches a predetermined number.

When the collection is terminated in some way or other, the destination terminal selects the route whose route weight value total is the minimum (step S153). Then, the destination terminal sends back the search route response indicating the selected route (step S154). As shown in step S135 in FIG. 13, the wireless terminal 11 that is going to start communication receives this search route response to start communication via the decided route. In the example above, the first wireless terminal $11_1$ and the eighth wireless terminal $11_8$ can start communication.

In step S147 in FIG. 15 where an intermediary terminal issues the route search command to the next destination, there is a possibility that the next destination terminal has already left the local network at that time. Processing in such a case does not produce any problem. This is because, although the route sequentially followed by the wireless terminal 11 that is going to start communication is broken at this time, such a broken route is not basically available for communication and therefore continuing such processing is meaningless.

The following describes processing executed when a wireless terminal 11 on a route, on which communication has already started, leaves the local network. When some wireless terminal 11 leaves the local network during the route setup stage that is executed before starting communication, another route that does not pass through the wireless terminal 11 should be selected. However, when the wireless terminal 11 on the route leaves the local network during communication, the route must be reconfigured.

Figure 17:
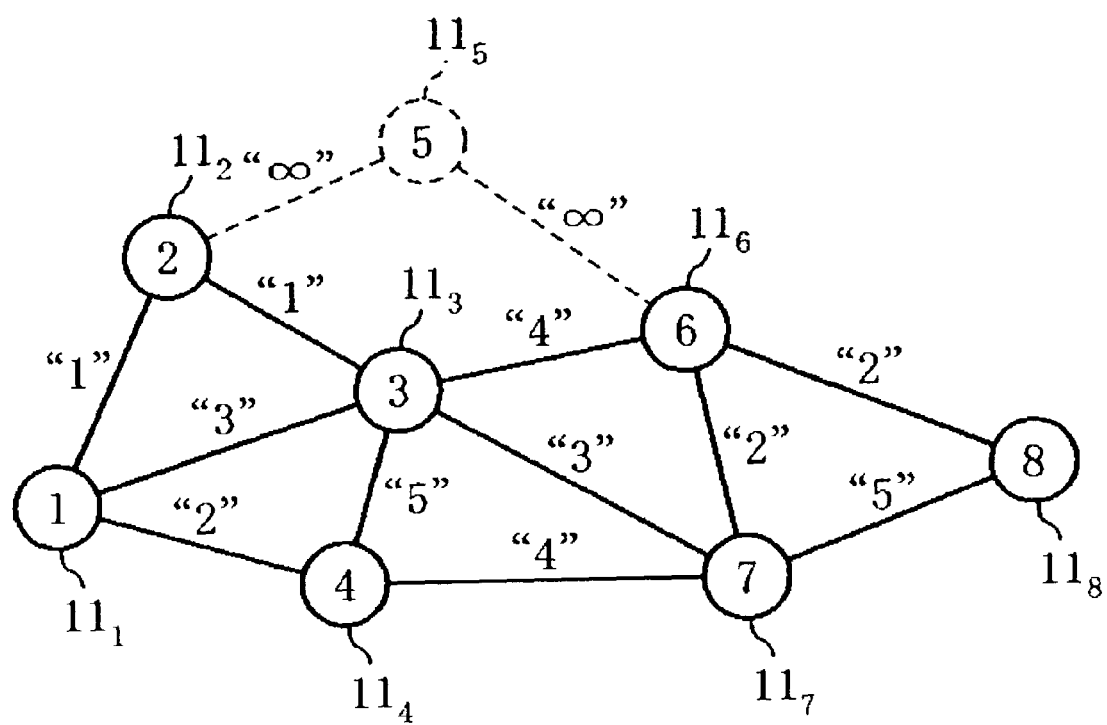
FIG. 17 is a diagram showing an example in which a terminal on a route, on which communication is established, leaves the local network.

FIG. 17 shows an example in which a terminal on a route, on which communication is established, leaves the local network. Again, in the example shown in this figure, the communication route is set up between the first wireless terminal $11_1$ and the eighth wireless terminal $11_8$. The path is composed of the following terminals sequentially arranged: first wireless terminal $11_1$, second wireless terminal $11_2$, fifth wireless terminal $11_5$, sixth wireless terminal $11_6$, and eighth wireless terminal $11_8$. In this case, if the fifth wireless terminal $11_5$ has moved to a place where radio waves do not reach or if the power supply of the terminal is made off for some reason or other, the link disappears. This prevents the first wireless terminal $11_1$ and the eighth wireless terminal $11_8$ from communicating on the route on which they have been communicating.

In such a circuimstance, the second wireless terminal $11_2$ and the sixth wireless terminal $11_6$, which are the neighboring terminals of the fifth wireless terminal $11_5$, each set the weight value of the link between itself and the fifth wireless terminal $11_5$ to ∞ (infinity) as shown in the figure. Instead of transferring the data packets received from the first wireless terminal $11_1$ to some other terminal, the second wireless terminal $11_2$ sends the data packets back to the first wireless terminal $11_1$ indicating that the selected route has become unavailable. In response to those packets, the first wireless terminal $11_1$ searches for a new route to the eighth wireless terminal $11_8$ using the procedure described above.

Figure 18:
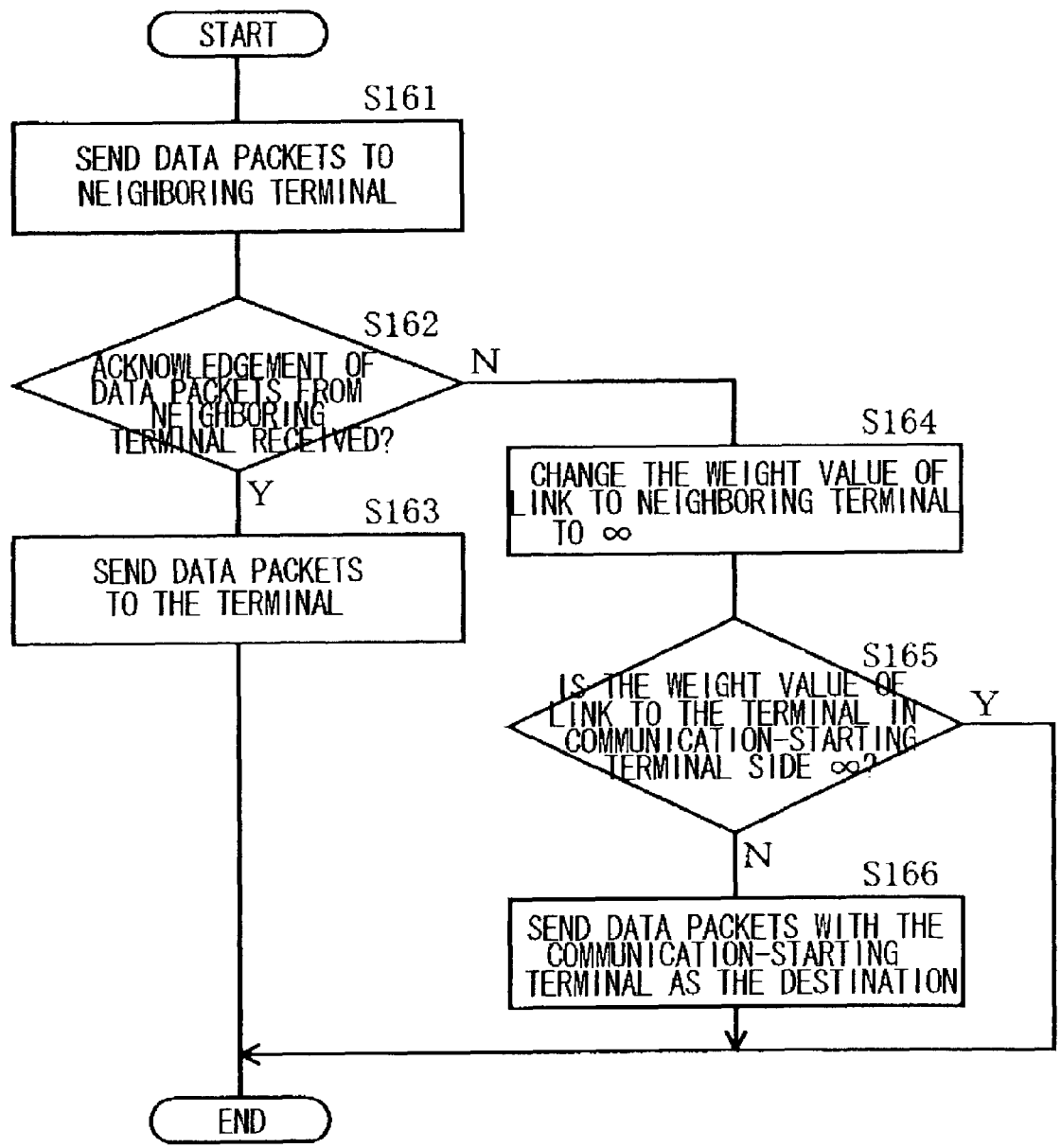
FIG. 18 is a flowchart showing the flow of processing executed by each intermediary terminal after communication is started in the embodiment.

FIG. 18 shows the flow of processing performed by an intermediary terminal after communication starts. After sending data packets to a neighboring terminal (step S161 in FIG. 18), the wireless terminal 11 checks if an acknowledgement to the data packets is received from the neighboring terminal (step S162). If the acknowledgement is received (Y), the data packets are sent to the wireless terminal 11 that has responded (step S163).

On the other hand, if no acknowledgement is received from the next terminal and the data packets cannot be sent to that terminal (step S162: N), the weight value of the link to that wireless terminal 11 is changed to ∞ (step S164). Then, a check is made if the weight value of the link of the communication-starting terminal side (first wireless terminal $11_1$ in this example) is ∞ (step S165). If the weight value is ∞ (Y), the processing is terminated without performing any processing (End). This prevents the sixth wireless terminal $11_6$ in this example, which has received data packets from the eighth wireless terminal $11_8$, from sending back data packets to the eighth wireless terminal $11_8$, which is the destination terminal, to indicate that the selected route is unavailable. Sending such data packets would cause both the first wireless terminal $11_1$ and the eighth wireless terminal $11_8$ to start searching for a route.

If the weight value of the link to the next wireless terminal 11 in the communication-starting terminal side in relation to the wireless terminal 11 that is checked in step S165 is not ∞ (N), the data packets are sent with the communication-starting wireless terminal 11 as the destination (step S166). In this example, the data packets are sent directly to the first wireless terminal $11_1$. A plurality of wireless terminals 11, if present along the path, perform the processing shown in FIG. 18 to propagate the packets from one terminal to another on the local network.

Modification of the present invention will now described in the below.

Figure 19:
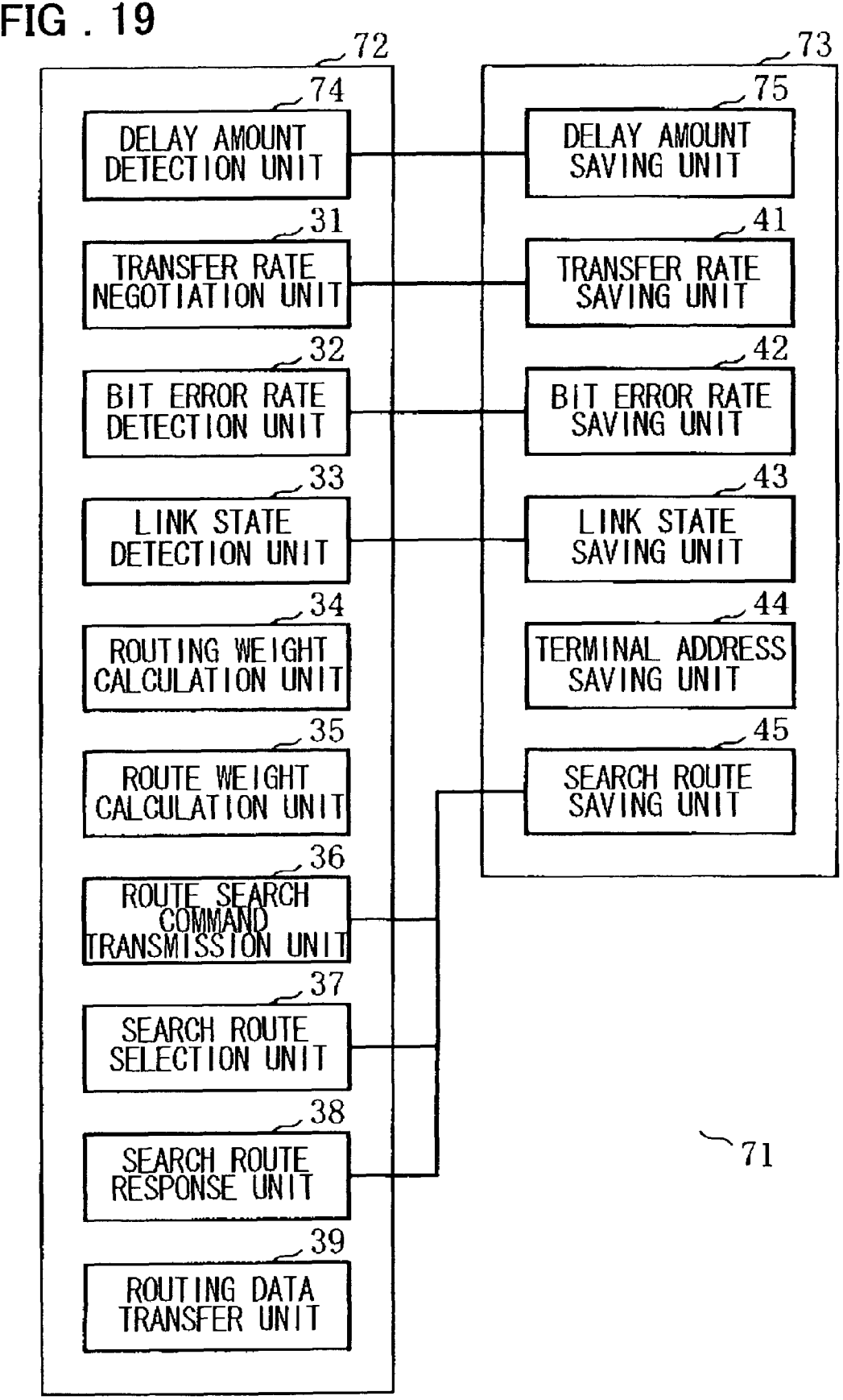
FIG. 19 is a block diagram showing the configuration of a wireless terminal in a modified embodiment.

FIG. 19 shows the configuration of a modification of the wireless terminal according to the present invention. In the figure, the same references numerals as those of the embodiment in FIG. 2 described above denote the same structural elements and the description of those elements is omitted. A wireless terminal 71 in this modification corresponds to the wireless terminals $11_1$-$11_8$ in the embodiment described above. The wireless terminal 71 comprises a parameter detection unit 72, which detects parameters used for routing between a data sending terminal and a data receiving terminal in a radio local network such as the one shown in FIG. 1, and a detection result saving unit 73 used to save the detected results. The parameter detection unit 72 has a configuration in which a delay amount detection unit 74 is added to the circuit devices of the parameter detection unit 21 shown in FIG. 2. The detection result saving unit 73 has a configuration in which a delay amount saving unit 75 is added to the circuit devices of the detection result saving unit 22 shown in FIG. 2.

When the route search command is relayed, the delay amount detection unit 74 detects the processing delay amount of a wireless terminal at an intermediary point between a data packet source terminal and a wireless terminal at the other end of the line. The delay amount detected by the delay amount detection unit 74 is saved in the delay amount saving unit 75 of the detection result saving unit 73.

Figure 20:
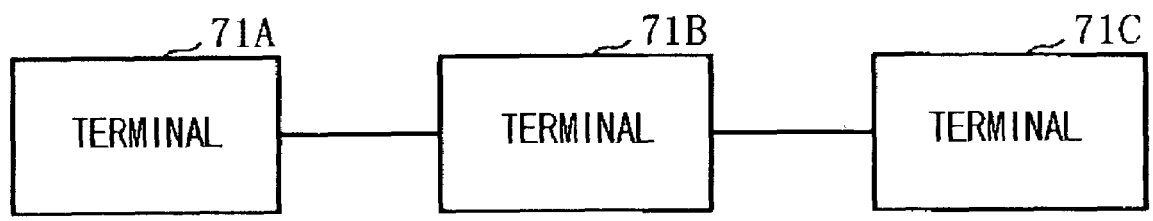
FIG. 20 is a diagram showing a simple configuration in which three wireless terminals in the modified embodiment form a route.

FIG. 20 shows an example of a simple configuration in which a route is formed by three wireless terminals. In this configuration, a terminal that is going to start communication is a source terminal 71A and the terminal at the other end of the line is the destination terminal 71C. The terminal that is the neighbor of the source terminal 71A is a neighboring terminal (or intermediary terminal) 71B. Data packets issued from the source terminal 71A are sent to the destination terminal 71C via the neighboring terminal 71B.

Assume that a delay time of n seconds is generated from the time the neighboring terminal 71B receives the data transmission instruction from the source terminal 71A to the time the neighboring terminal 71B sends the data transmission instruction to the destination terminal 71C. In such a case, the actual transfer rate RTrRate (bits/second), which is determined by the transfer rate negotiation unit 31 (FIG. 19), with respect to the predetermined transfer rate TrRate (bits/second) is represented by the following equation (2):

$$RTrRate = TrRate/(1+n)\text{(bits/second)} \quad (2)$$

Let RootWD, TrRateD, TrD, BER, TWK, and BWK be the route weight value, the predetermined transfer rate when the delay amount is taken into consideration, the delay amount of the neighboring terminal (or intermediary terminal) 71B, the bit error rate, the weighting coefficient of the transfer rate, and the weighting coefficient of the bit error rate respectively. In this case, the route weight value is calculated by the following equation (3).

$$RootWD = BER*BW/(TrRateD/(1+TrD))*TWK \quad (3)$$

Accordingly, setting the root weight value with the delay amount taken into consideration allows a wireless terminal to search for the optimized route with consideration for the data transfer delay of the neighboring terminal (or intermediary terminal) 71B.

The embodiment and the modification described above may be applied not only to an ad hoc network but also to other wireless communication systems in which wireless terminals are used as intermediary terminals.

The meritorious effects of the present invention are summarized as follows.

According to the first to sixth aspects of the present invention, terminals, each of which propagates a route search request to the next terminal, attach to the route search request the weight value of the next communication path to which the request is to be sent, as described above and hence, upon receiving the route search request, the communication destination can easily find which route is best based on the weight value that has been added up. This not only makes it possible to do route search processing quickly but also, on the communication starting side, makes route search processing easy.

According to the second aspect of the present invention, the wireless terminal comprises bit error rate measuring means that measures bit error rates of communication paths each of which has one end connected to a neighboring terminal and transfer rate setting means that, for each of the communication paths each of which has one end connected to a neighboring terminal, sets a data transfer rate of the communication path. This makes it possible to set a weight value using the bit error rate and the data transfer rate, allowing the wireless terminal to select the best route based on both communication speed and data reliability.

According to the third aspect of the present invention, the wireless terminal further comprises communication unavailability notifying means that, when the communication path via which the data relaying means will send data becomes unavailable, notifies a communication-starting terminal of this fact using the rest of the routes decided by the route deciding means. Accordingly, when communication cannot be established, the communication-starting terminal can receive information on this condition and reset the route as necessary. Again, in this case, the load of the communication-starting terminal is reduced and the terminal can take action quickly.

According to the fourth aspect of the present invention, the weight value attached to the route search request is an added-up value of the weight values of the communication paths beginning with the source of the route search request. Therefore, the route deciding means can easily compare the added-up values to decide the route.

According to the fifth aspect of the present invention, when communication paths are selected, one after another, to set a route, an already-selected communication path is not selected again. This not only prevents a path, which will form a closed loop before reaching the communication destination, from being formed but also reduces the traffic.

According to the sixth aspect of the present invention, the route deciding means decides the best route based on the weight value as well as on a time required for the route search request to be received via each route. This makes it possible to select a practical route based on an actual communication speed.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A wireless terminal comprising:
    weight value setting means for dynamically setting a weight value of communication paths based on a communication status for each of a plurality of communication paths, each having one end connected to a neighboring other terminal, said weight value of the communication paths being a reference value for selection when communication is performed over the communication paths;
    route search request relaying means, on receipt of a route search request from another terminal different from the wireless terminal of communication source, said route search request issued for establishing a communication route to a predetermined terminal as a communication destination, with the weight value of the communication paths, through which said route search request has passed, attached thereto, sending to a predetermined communication path the route search request with a weight value of the communication path attached thereto, said predetermined communication path being selected from among communication paths beginning at the wireless terminal of communication source and being connected to the wireless terminal of neighbor based on the weight values of the communication paths;
    route deciding means, on receipt of the route search request specifying the wireless terminal as a communication destination, deciding a best route based on the weight value of the communication paths through which the route search request has passed, said weight value being attached to the route search request; and route search result notifying means for notifying the route decided by said route deciding means to a source terminal of the route search request.

2. The wireless terminal as defined in claim 1 wherein the weight value attached to the route search request is an added-up value of the weight values of the communication paths beginning with the source of the route search request and wherein said route deciding means decides the best route based on a magnitude of the added-up value.

3. The wireless terminal as defined in claim 1 wherein said route deciding means decides the best route based on the weight value as well as on a time required for the route search request to be received via each route.

4. A wireless terminal comprising:

bit error rate measuring means for measuring bit error rate of each of plurality of communication paths, each having one end connected to a neighboring other terminal that is a neighbor to the wireless terminal;

transfer rate setting means for setting a data transfer rate of each of the communication paths, each having one end connected to the neighboring other terminal that is a neighbor to the wireless terminal;

weight value setting means for dynamically setting weight values based on measurement and setting contents of said bit error rate measuring means and said transfer rate setting means, said weight value being a reference value for setting a route for communication with a destination terminal over the communication paths;

route search request sending means for sending a route search request with the weight value attached thereto, to each of the communication paths, each beginning at, and being connected to, the wireless terminal, when communication is started after selecting routes via which communication is performed with a predetermined destination;

route search request relaying means, on receipt of the route search request with the weight value of communication paths, through which the route search request has passed, attached thereto, sending to a predetermined communication path the route search request with the weight value of the communication path attached thereto, said predetermined communication path beginning at the wireless terminal of communication source and being selected from among communication paths connected to the wireless terminal of neighbor based on the weight values of the communication paths;

route deciding means, on receipt of the route search request specifying the wireless terminal as a communication destination, deciding a best route based on the weight value of the communication paths through which the route search request has passed, said weight value being attached to the route search request;

route search result notifying means for notifying the route decided by said route deciding means to a source terminal of the route search request; and communication starting means for initiating communication for the communication destination according to the indicated route, when the notification sent by said route search result notifying means is received by the source terminal of the route search request.

5. The wireless terminal as defined in claim 4 wherein the weight value attached to the route search request is an added-up value of the weight values of the communication paths beginning with the source of the route search request and wherein said route deciding means decides the best route based on a magnitude of the added-up value.

6. The wireless terminal as defined in claim 4 wherein said route deciding means decides the best route based on the weight value as well as on a time required for the route search request to be received via each route.

7. A wireless terminal comprising:

weight value setting means for setting a weight value of communication paths for each of a plurality of communication paths each having one end connected to a neighboring other terminal that is a neighbor to the wireless terminal of the communication source, said weight value of the communication paths being a reference value for selection when communication is performed over the communication paths;

route search request sending means for sending a route search request with the weight value attached thereto, to each of the communication paths, each beginning at, and being connected to, the wireless terminal of neighbor, when communication is started after selecting routes via which communication is performed with a predetermined destination;

route search request relaying means, on receipt of the route search request by the own terminal, said route search request having the weight value of the communication paths, through which the route search request has passed, attached thereto, sending to a predetermined communication path the route search request with the weight value of the communication paths attached thereto, said predetermined communication path beginning at the own terminal and being selected from among communication paths connected to the wireless terminal of neighbor based on the weight values of the communication paths;

route deciding means, on receipt of the route search request specifying the wireless terminal as a communication destination by the wireless terminal, deciding a best route based on the weight value of the communication paths through which the route search request has passed, said weight value being attached to the route search request;

route search result notifying means for notifying the route decided by said route deciding means to a source terminal of the route search request;

communication starting means for initiating communication for the communication destination according to the indicated route, when the notification sent by said route search result notifying means is received by the source terminal of the route search request;

data relaying means for sending data sent from the source terminal of the route search request after the route is decided, to a next communication path according to the route; and communication unavailability notifying means, in case of the communication path via which said data relaying means send data being unavailable, notifying a communication initiating terminal of the communication unavailability by using rest of the routes decided by said route deciding means.

8. The wireless terminal as defined in claim 7 wherein the weight value attached to the route search request is an added-up value of the weight values of the communication paths beginning with the source of the route search request and wherein said route deciding means decides the best route based on a magnitude of the added-up value.

9. The wireless terminal as defined in claim 7 wherein the weight value attached to the route search request is an added-up value of the weight values of the communication paths beginning with the source of the route search request and wherein said route deciding means decides the best route based on a magnitude of the added-up value.

10. The wireless terminal as defined in claim 7 wherein said route deciding means decides the best route based on the weight value as well as on a time required for the route search request to be received via each route.

11. A wireless terminal comprising:

weight value setting means for setting a weight value of communication paths for each of a plurality of communication paths, each having one end connected to a neighboring other terminal, said weight value of the communication paths being a reference value for selection when communication is performed over the communication paths;

route search request relaying means, on receipt of a route search request from another terminal different from the wireless terminal of communication source, said route search request issued for establishing a communication route to a predetermined terminal as a communication destination, with the weight value of the communication paths, through which said route search request has passed, attached thereto, sending to a predetermined communication path the route search request with a weight value of the communication path attached thereto, said predetermined communication path being selected from among communication paths beginning at the wireless terminal of communication source and being connected to the wireless terminal of neighbor based on the weight values of the communication paths;

route deciding means, on receipt of the route search request specifying the wireless terminal as a communication destination, deciding a best route based on the weight value of the communication paths through which the route search request has passed, said weight value being attached to the route search request; and route search result notifying means for notifying the route decided by said route deciding means to a source terminal of the route search request.

wherein said route search request relaying means selects the communication path not using an already-selected communication path by referencing the route sent with the route search request and relays the route search request.

12. A wireless terminal comprising:

bit error rate measuring means for measuring bit error rate of each of plurality of communication paths, each having one end connected to a neighboring other terminal that is a neighbor to the wireless terminal;

transfer rate setting means for setting a data transfer rate of each of the communication paths, each having one end connected to the neighboring other terminal that is a neighbor to the wireless terminal;

weight value setting means for setting weight values based on measurement and setting contents of said bit error rate measuring means and said transfer rate setting means, said weight value being a reference value for setting a route for communication with a destination terminal over the communication paths;

route search request sending means for sending a route search request with the weight value attached thereto, to each of the communication paths, each beginning at, and being connected to, the wireless terminal, when communication is started after selecting routes via which communication is performed with a predetermined destination;

route search request relaying means, on receipt of the route search request with the weight value of communication paths, through which the route search request has passed, attached thereto, sending to a predetermined communication path the route search request with the weight value of the communication path attached thereto, said predetermined communication path beginning at the wireless terminal of communication source and being selected from among communication paths connected to the wireless terminal of neighbor based on the weight values of the communication paths;

route deciding means, on receipt of the route search request specifying the wireless terminal as a communication destination, deciding a best route based on the weight value of the communication paths through which the route search request has passed, said weight value being attached to the route search request;

route search result notifying means for notifying the route decided by said route deciding means to a source terminal of the route search request; and communication starting means for initiating communication for the communication destination according to the indicated route, when the notification sent by said route search result notifying means is received by the source terminal of the route search request, wherein the weight value attached to the route search request is an added-up value of the weight values of the communication paths beginning with the source of the route search request and wherein said route deciding means decides the best route based on a magnitude of the added-up value.

* * * * *